(12) United States Patent
Kotake et al.

(10) Patent No.: US 12,134,708 B2
(45) Date of Patent: Nov. 5, 2024

(54) TREATMENT AGENT FOR TREATING PARTICLES, WATER- REPELLENT PARTICLES AND PRODUCTION METHOD THEREFOR, WATER-REPELLENT LAYER, AND PENETRATION PREVENTING STRUCTURE

(71) Applicant: HITACHI CHEMICAL COMPANY, LTD., Tokyo (JP)

(72) Inventors: Tomohiko Kotake, Tokyo (JP); Tatsuya Makino, Tokyo (JP); Kouta Iwanaga, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 1085 days.

(21) Appl. No.: 16/482,300

(22) PCT Filed: Feb. 1, 2018

(86) PCT No.: PCT/JP2018/003464
§ 371 (c)(1),
(2) Date: Jul. 31, 2019

(87) PCT Pub. No.: WO2018/143363
PCT Pub. Date: Aug. 9, 2018

(65) Prior Publication Data
US 2019/0345362 A1    Nov. 14, 2019

(30) Foreign Application Priority Data

Feb. 2, 2017    (WO) .................. PCT/JP2017/003804

(51) Int. Cl.
*C09K 3/18*    (2006.01)
*C09D 183/06*    (2006.01)
(Continued)

(52) U.S. Cl.
CPC .............. *C09D 183/06* (2013.01); *C09K 3/18* (2013.01); *C08G 77/14* (2013.01); *C08G 77/16* (2013.01); *C08G 77/18* (2013.01); *C09D 183/04* (2013.01)

(58) Field of Classification Search
CPC ...... C09D 183/06; C09D 183/04; C09K 3/18; C08G 77/14; C08G 77/16; C08G 77/18
(Continued)

(56) References Cited

U.S. PATENT DOCUMENTS 3,629,228 A    12/1971    Hartlein
4,234,441 A    11/1980    Scott
(Continued)

FOREIGN PATENT DOCUMENTS

EP    0902067 A    3/1999
EP    2963325 A1    1/2016
(Continued)

*Primary Examiner* — Ruiyun Zhang
(74) *Attorney, Agent, or Firm* — FITCH, EVEN, TABIN & FLANNERY, LLP

(57) ABSTRACT

The present invention relates to a treatment agent for treating particles, the treatment agent comprising a condensation product of a liquid composition comprising at least one selected from the group consisting of a polysiloxane compound having a hydrolyzable functional group or a condensable functional group and a hydrolyzate of the polysiloxane compound having a hydrolyzable functional group.

8 Claims, 7 Drawing Sheets

(51) Int. Cl.
  *C08G 77/14* (2006.01)
  *C08G 77/16* (2006.01)
  *C08G 77/18* (2006.01)
  *C09D 183/04* (2006.01)

(58) Field of Classification Search
  USPC ............................................. 428/331
  See application file for complete search history.

(56) References Cited

U.S. PATENT DOCUMENTS

| | | | |
|---|---|---|---|
| 4,258,102 A | | 3/1981 | Traver |
| 4,617,057 A | | 10/1986 | Plueddemann |
| 5,763,505 A | | 6/1998 | Derian |
| 2008/0269358 A1 | * | 10/2008 | Inoue .................. C09C 1/3081 |
| | | | 516/34 |
| 2015/0175863 A1 | | 6/2015 | Baily |
| 2017/0283269 A1 | * | 10/2017 | Kotake ................ C01B 33/158 |

FOREIGN PATENT DOCUMENTS

| | | | | |
|---|---|---|---|---|
| EP | 3112405 A | 1/2017 | | |
| JP | H4-371651 A | 12/1992 | | |
| JP | H7-048559 A | 2/1995 | | |
| JP | H7-258549 A | 10/1995 | | |
| JP | H07-305053 A | 11/1995 | | |
| JP | 2000-026609 A | 1/2000 | | |
| JP | 2000-104047 A | 4/2000 | | |
| JP | 2001-146627 A | 5/2001 | | |
| JP | 2006-200083 A | 8/2006 | | |
| JP | 2007-177232 A | 7/2007 | | |
| JP | 2010-235931 A | 10/2010 | | |
| JP | 2011-026402 A | 2/2011 | | |
| JP | 2012-233110 A | 11/2012 | | |
| KR | 10-2013-0082217 A | 7/2013 | | |
| WO | 2015/129736 A1 | 9/2015 | | |
| WO | WO-2016047740 A1 | * | 3/2016 | ............... B32B 9/00 |
| WO | 2017/010551 A1 | 1/2017 | | |

* cited by examiner

TREATMENT AGENT FOR TREATING PARTICLES, WATER- REPELLENT PARTICLES AND PRODUCTION METHOD THEREFOR, WATER-REPELLENT LAYER, AND PENETRATION PREVENTING STRUCTURE

CROSS-REFERENCE TO RELATED APPLICATIONS

This application is a U.S. national phase application filed under 35 U.S.C. § 371 of International Application No. PCT/JP2018/003464, filed Feb. 1, 2018, designating the United States, which claims priority from International Application No. PCT/JP2017/003804, filed Feb. 2, 2017, designating the United States, which are hereby incorporated herein by reference in their entirety.

TECHNICAL FIELD

The present invention relates to a treatment agent for treating particles, water-repellent particles and a production method therefor, and a water-repellent layer and a penetration preventing structure using those water-repellent particles.

BACKGROUND ART

As a technique for water-repellent finishing or oil-repellent finishing of particles, for example, there is generally known a method of coating the particles with a solution, an emulsion, a dispersion or the like obtained by dissolving or dispersing a water-repellent compound in a solvent or water, and then vaporizing the solvent, water, and the like to form a water-repellent continuous film.

Patent Literature 1 discloses a method of treating an inorganic material with a specific chlorosilane compound.

CITATION LIST

Patent Literature

Patent Literature 1: Japanese Unexamined Patent Publication No. H7-48559

SUMMARY OF INVENTION

Technical Problem

It is also noted that the treatment agent used to impart water repellency to the particles is required to be excellent in water repellency. Further, it is considered preferable that the treatment agent impart water repellency without impairing the characteristics of the particles.

The present invention has been made in view of the above-described circumstances, and an object thereof is to provide a treatment agent for treating particles capable of imparting excellent water repellency without impairing the characteristics of the particles. Another object of the present invention is to provide water-repellent particles and a production a method therefor using the above-mentioned treatment agent, and a water-repellent layer and a penetration preventing structure using those water repellent particles.

Solution to Problem

As a result of intensive studies to achieve the above object, the present inventors discovered a treatment agent obtained by using a liquid composition comprising a polysiloxane compound having a reactive group (hydrolyzable functional group or condensable functional group) in the molecule exhibits excellent water repellency without impairing the characteristics of the particles, based on which the present invention has been completed.

The present invention provides a treatment agent for treating particles, the treatment agent comprising a condensation product of a liquid composition comprising at least one selected from the group consisting of a polysiloxane compound having a hydrolyzable functional group or a condensable functional group and a hydrolyzate of the polysiloxane compound having a hydrolyzable functional group. Further, the present invention provides a treatment agent for treating particles, the treatment agent comprising a liquid composition comprising at least one selected from the group consisting of a polysiloxane compound having a hydrolyzable functional group or a condensable functional group and a hydrolyzate of the polysiloxane compound having a hydrolyzable functional group. According to such a treatment agent, excellent water repellency can be imparted without impairing the characteristics of the particles.

In the above-mentioned treatment agent, the liquid composition may further comprise silica particles. Such a treatment agent further improves water repellency and durability.

The number of silanol groups per g of the silica particles may be $10 \times 10^{18}$ to $1000 \times 10^{18}$ groups/g. This enables the treatment to be conducted at low temperature and in a short time, and also further improves water repellency. As a result, the adhesiveness between the treatment agent and the particle is improved.

When the condensable functional group is a hydroxyalkyl group, examples of the polysiloxane compound include a compound represented by the following formula (A). This enables even better water repellency and adhesiveness to be achieved.

[Chemical Formula 1]

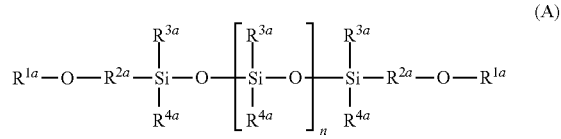

(A)

[wherein $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50.]

When the hydrolyzable functional group is an alkoxy group, examples of the polysiloxane compound include a compound represented by the following formula (B). This enables even better water repellency and adhesiveness to be achieved.

[Chemical Formula 2]

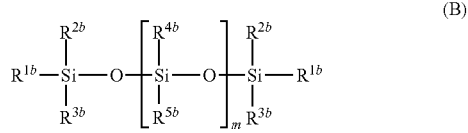

(B)

[wherein $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50.]

In the above-mentioned treatment agent, the liquid composition may further comprise at least one selected from the group consisting of a silane monomer having a hydrolyzable functional group or a condensable functional group, and a hydrolyzate of the silane monomer having a hydrolyzable functional group. This enables even better water repellency and adhesiveness to be achieved.

In the above-mentioned treatment agent, the liquid composition may further comprise aerogel particles. As a result, water repellency is further improved.

The above-mentioned treatment agent may be used to form a water-repellent portion on a surface to be treated of the particle. By forming such a water-repellent portion, even better water repellency can be achieved. At this time, the water-repellent portion may contain an aerogel.

In addition, the present invention provides a treatment agent for treating particles, the treatment agent comprising a water-repellent component comprising a compound having a structure represented by the following formula (1). Such a treatment agent can impart excellent water repellency without impairing the characteristics of the particles.

[Chemical Formula 3]

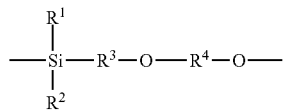

(1)

[wherein $R^1$ and $R^2$ each independently represent an alkyl group or an aryl group, and $R^3$ and $R^4$ each independently represent an alkylene group.]

Still further, the present invention provides a treatment agent for treating particles, the treatment agent comprising a water-repellent component having a ladder structure comprising a strut portion and a bridge portion, wherein the bridge portion comprises a compound represented by the following formula (2). Such a treatment agent has excellent water repellency and durability due to the ladder structure.

[Chemical Formula 4]

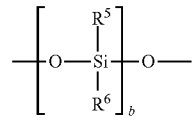

(2)

[wherein $R^5$ and $R^6$ each independently represent an alkyl group or an aryl group, and b represents an integer of 1 to 50.]

Examples of the compound having ladder structure include compounds having a structure represented by the following formula (3). This enables even better water repellency and durability to be achieved.

[Chemical Formula 5]

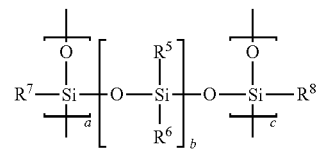

(3)

[wherein $R^5$, $R^6$, $R^7$, and $R^8$ each independently represent an alkyl group or an aryl group, a and c each independently represent an integer of 1 to 3000, and b represents an integer of 1 to 50.]

The present invention provides a method for producing water-repellent particles, which comprises the step of treating the particles with the above-mentioned treatment agent. According to such a production method, particles having excellent water repellency can be produced without impairing the characteristics of the particles.

The present invention provides a water-repellent particle comprising a particle and a water-repellent portion including a dried product of the above treatment agent on a surface to be treated of the particle. Such particles are excellent in water repellency.

The present invention also provides a water-repellent particle comprising a particle and a water-repellent portion including a compound having a structure represented by the above formula (1) on a surface to be treated of the particle. Such particles are excellent in water repellency and durability.

The present invention also provides a water-repellent particle comprising a particle and, on a surface to be treated of the particle, a water-repellent portion including a compound having a ladder structure comprising a strut portion and a bridge portion, wherein the bridge portion is represented by the above formula (2). Such a particle has excellent water repellency and durability due to the ladder-type structure.

Examples of the compound having a ladder type structure include compounds having a structure represented by the above formula (3). This enables even better excellent water repellency and durability to be achieved.

The water-repellent portion may comprise an aerogel. Further, the water-repellent component may be an aerogel. This enables even better excellent water repellency to be achieved.

The present invention also provides a water-repellent layer comprising an aggregation having a plurality of the above-mentioned water-repellent particles. The water-repellent layer is excellent in water repellency as a result of having a plurality of particles excellent in water repellency, and since those water-repellent particles maintain their characteristics as particles, various functions of the particles can be added.

The present invention provides a penetration preventing structure comprising the above-mentioned water-repellent layer. As a result of having a water-repellent layer excellent in water repellency, the penetration preventing structure is excellent in preventing penetration of water, and various functions possessed by the water-repellent layer can be added.

Advantageous Effects of Invention

According to the present invention, there can be provided a treatment agent for treating particles capable of imparting excellent water repellency without impairing the characteristics of the particles. According to the present invention, there can also be provided water-repellent particles and a production a method therefor using the above-mentioned treatment agent, and a water-repellent layer and a penetration preventing structure using the water repellent particles.

DESCRIPTION OF EMBODIMENTS

Figure 1:
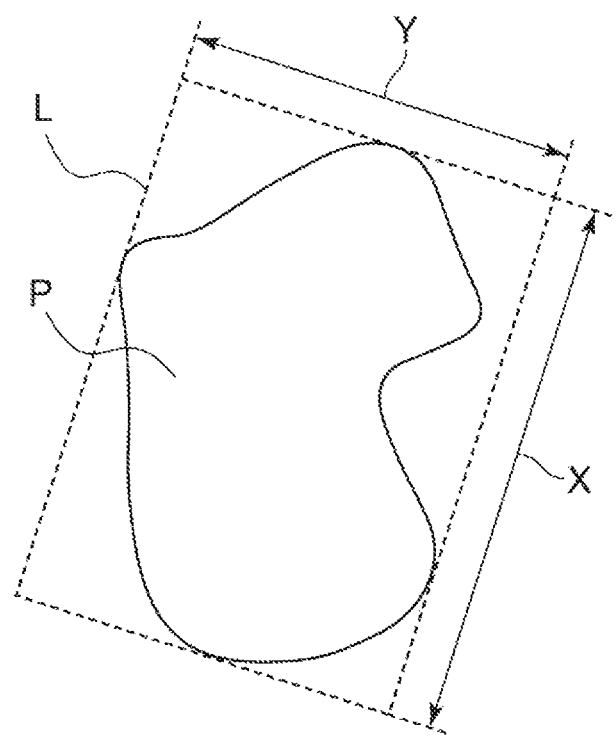
FIG. 1 is a diagram illustrating a method of calculating a two-axis average primary particle size of particles.

Hereinafter, preferred embodiments of the present invention will be described in detail with reference to the drawings as needed. However, the present invention is not limited to the following embodiments.

Definitions

As used herein, a numerical range indicated by using "to" indicates a range including the numerical values described before and after the "to" as the minimum value and the maximum value, respectively. In numerical ranges described in stages as used herein, the upper limit or lower limit of the numerical range of one stage may be replaced with the upper limit or lower limit of the numerical range of another stage. In the numerical ranges described herein, the upper limit value or the lower limit value of the numerical range may be replaced with a value shown in the Examples. "A or B" may contain either A or B, or may contain both. The materials exemplified herein can be used singly or in combination of two or more unless otherwise specified. As used herein, when a plurality of substances corresponding to each component is present in the composition, unless otherwise specified, the content of each component in the composition means the total amount of the plurality of substances present in the composition.

<Treatment Agent for Treating Particles>

The treatment agent of the present embodiment is an agent for treating particles. Examples of the treatment agent of the present embodiment include the following first to fourth aspects. By employing each aspect, it is possible to obtain water repellency and thermal insulation properties according to each aspect.

(First Aspect)

The treatment agent according to one embodiment includes a condensation product of a liquid composition containing at least one selected from the group consisting of a polysiloxane compound having a hydrolyzable functional group or a condensable functional group (in the molecule) and a hydrolyzate of the polysiloxane compound having a hydrolyzable functional group (hereinafter, sometimes referred to as "polysiloxane compound group"). The treatment agent may also include a liquid composition containing at least one selected from the group consisting of a polysiloxane compound having a hydrolyzable functional group or a condensable functional group and a hydrolyzate of the polysiloxane compound having a hydrolyzable functional group (the treatment agent may be the liquid composition). According to such a treatment agent, excellent water repellency can be imparted without impairing the characteristics of the particles. The treatment agent may be used to form a water-repellent portion (treatment portion) on the surface to be treated of the particles. The water-repellent portion formed from the treatment agent has excellent water repellency and also has excellent adhesiveness to the surface to be treated. The water-repellent portion formed from the treatment agent is formed at a low temperature in a short time, and therefore excellent water repellency can be imparted without impairing the characteristics of the particles. The water-repellent portion may be, for example, a form including at least one of a film and particles. More specifically, the treatment agent of the present embodiment may form a water-repellent portion in the form of a film and/or particles on the surface to be treated of the particles.

The present inventors speculate that the reason why the treatment agent of the present embodiment exhibits excellent water repellency is as follows. It is considered that because the treatment agent of the present embodiment contains a polysiloxane compound group, reactions are controlled more easily than, for example, a treatment agent containing only a siloxane monomer as a siloxane compound. As a result, it is considered that it is easier to decrease hydrophilic groups (e.g., hydroxyl groups) in the compound forming the water-repellent portion, and that excellent water repellency is exhibited.

Further, it is considered that the water-repellent portion formed from the treatment agent of the present embodiment is resistant to adhesiveness of hydrophilic stains and that it is easier to remove such stains. Therefore, it is considered that the above-mentioned treatment agent is easy to apply to applications in which hydrophilic stains tend to adhere.

In conventional water-repellent finishing, an adhesive, an additive, and the like are generally added to improve the adhesion between the water-repellent treatment agent and the particles. On the other hand, when an adhesive and an additive are added, usually, water repellency, abrasion resistance, and solvent resistance tend to decrease. In contrast, since the treatment agent of the present embodiment is also excellent in adhesiveness, water repellency, abrasion resistance, and solvent resistance, it is considered that the above-mentioned adhesive and additive are not necessarily required.

In addition, since it is difficult to decrease hydrophilic groups (e.g., hydroxyl groups) in the compound forming the water-repellent portion, it is considered that a water-repellent material including a chlorosilane compound is not sufficient in water repellency. In contrast hand, it is considered that the treatment agent of the present embodiment can impart excellent water repellency without impairing the properties of the particles.

Examples of the hydrolyzable functional group include an alkoxy group. Examples of the condensable functional group (excluding the functional group corresponding to the hydrolyzable functional group) include a hydroxyl group, a silanol group, a carboxyl group, and a phenolic hydroxyl group. The hydroxyl group may be contained in a hydroxyl group-containing group such as a hydroxyalkyl group. The polysiloxane compound having a hydrolyzable functional group or a condensable functional group may further have a reactive group different from the hydrolyzable functional group and the condensable functional group (a functional group not corresponding to the hydrolyzable functional group or the condensable functional group). Examples of the reactive groups include an epoxy group, a mercapto group, a glycidoxy group, a vinyl group, an acryloyl group, a methacryloyl group, and an amino group. The epoxy group may be contained in an epoxy group-containing group such as a glycidoxy group. The polysiloxane compound having these functional groups and reactive groups may be used singly or in a mixture of two or more. Among these functional groups and reactive groups, an alkoxy group, a silanol group, and a hydroxyalkyl group can improve the compatibility of the treatment agent and can suppress layer separation. Further, from the viewpoint of improving the reactivity of the polysiloxane compound, the number of carbons of the alkoxy group and the hydroxyalkyl group may be, for example, 1 to 6.

Examples of the polysiloxane compound having a hydroxyalkyl group include a compound having a structure represented by the following formula (A).

[Chemical Formula 6]

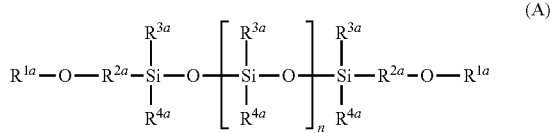

(A)

In formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. Here, examples of the aryl group include a phenyl group, and a substituted phenyl group. Further, examples of the substituent of the substituted phenyl group include an alkyl group, a vinyl group, a mercapto group, an amino group, a nitro group, and a cyano group. In formula (A), two $R^{1a}$ may be the same as or different from each other, and similarly, two $R^{2a}$ may be the same as or different from each other. In addition, in formula (A), two or more $R^{3a}$ may be the same or different from each other, and similarly, two or more $R^{4a}$ may be the same as or different from each other.

By using a treatment agent containing the polysiloxane compound having the above-mentioned structure, it is even easier to obtain excellent water repellency and adhesiveness. From such a viewpoint, in formula (A), examples of $R^{1a}$ include a hydroxyalkyl group in which the number of carbon atoms is 1 to 6; examples of the hydroxyalkyl group include a hydroxyethyl group and a hydroxypropyl group. Further, in formula (A), examples of $R^{2a}$ include an alkylene group in which the number of carbon atoms is 1 to 6; examples of the alkylene group include an ethylene group and a propylene group. In formula (A), examples of $R^{3a}$ and $R^{4a}$ include, each independently, an alkyl group in which the number of carbon atoms is 1 to 6 and a phenyl group; examples of the alkyl group include a methyl group. Further, in formula (A), n may be, for example, 2 to 30, or 5 to 20

A commercial product can be used as the polysiloxane compound having a structure represented by the above formula (A); examples thereof include compounds such as X-22-160AS, KF-6001, KF-6002, and KF-6003 (all of these being manufactured by Shin-Etsu Chemical Co., Ltd.), and compounds such as XF42-B0970, XF42-C5277, Fluid OFOH 702-4% (all of these being manufactured by Momentive).

Examples of the polysiloxane compound having an alkoxy group include compounds having a structure represented by the following formula (B).

[Chemical Formula 7]

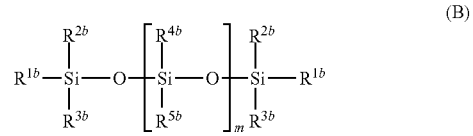

(B)

In formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. Here, examples of the aryl group include a phenyl group and a substituted phenyl group. Further, examples of the substituent of the substituted phenyl group include an alkyl group, a vinyl group, a mercapto group, an amino group, a nitro group, and a cyano group. In formula (B), two $R^{1b}$ may be the same as or different from each other, two $R^{2b}$ may be the same as or different from each other, and similarly two $R^{3b}$ may be the same as or different from each other. In addition, in formula (B), when m is an integer of 2 or more, two or more $R^{4b}$ may be the same or different from each other, and similarly, two or more $R^{5b}$ may also be the same as or different from each other.

By using a polysiloxane compound having the above-mentioned structure or a treatment agent containing a hydrolyzate thereof, it is even easier to obtain excellent water repellency and adhesiveness. From such a viewpoint, in formula (B), examples of $R^{1b}$ include an alkyl group in which the number of carbon atoms is 1 to 6, and an alkoxy group in which the number of carbon atoms is 1 to 6; examples of the alkyl group or the alkoxy group include a methyl group, a methoxy group, and an ethoxy group. In formula (B), examples of $R^{2b}$ and $R^{3b}$ include, each independently, an alkoxy group in which the number of carbon atoms is 1 to 6; examples of the alkoxy group include a methoxy group and an ethoxy group. In formula (B), examples of $R^{4b}$ and $R^{5b}$ include, each independently, an alkyl group in which the number of carbon atoms is 1 to 6 and a phenyl group; examples of the alkyl group include a methyl group. In formula (B), m may be, for example, 2 to 30, or 5 to 20.

The polysiloxane compound having a structure represented by the above formula (B) can be obtained by, for example, appropriately referring to the production methods reported in Japanese Unexamined Patent Publication No. 2000-26609, Japanese Unexamined Patent Publication No. 2012-233110, and the like.

In addition, since the alkoxy group is hydrolyzed, the polysiloxane compound having an alkoxy group may be present as a hydrolyzate in the liquid composition, or the polysiloxane compound having an alkoxy group and a hydrolyzate thereof may both be present. Further, in the polysiloxane compound having an alkoxy group, the alkoxy groups in the molecule may all be hydrolyzed or may be partially hydrolyzed.

The polysiloxane compound having a hydrolyzable functional group or a condensable functional group and the hydrolyzate of the polysiloxane compound having a hydrolyzable functional group may be used singly or in a mixture of two or more.

The treatment agent of the present embodiment may further contain silica particles from the viewpoint of further improving water repellency and durability. Specifically, the liquid composition may contain silica particles and at least one selected from the group consisting of a polysiloxane compound having a hydrolyzable functional group or a condensable functional group and a hydrolyzate of the polysiloxane compound having a hydrolyzable functional group. In such a treatment agent, the reason why water repellency is improved is thought to be because when the treatment agent contains silica particles, in the compound constituting the water-repellent portion, Q+T:D described later can be easily controlled, and it is easy to reduce the amount of hydroxyl groups in the above-mentioned compound.

The silica particles can be used without particular limitation, and examples thereof include amorphous silica particles. Examples of the amorphous silica particles include fused silica particles, fumed silica particles, and colloidal silica particles. Among these, colloidal silica particles are high in monodispersity and easily suppress aggregation in the treatment agent.

The shape of the silica particles is not particularly limited, and examples thereof include a spherical shape, a cocoon shape, and associated types. Among these, by using spherical particles as the silica particles, aggregation in the treatment agent is more easily suppressed. The average primary particle size of the silica particles may be, for example, from the viewpoint of more easily forming a water-repellent portion having an appropriate hardness and the viewpoint of more easily improving durability against thermal shocks and scratches, 1 nm or more, 5 nm or more, or 20 nm or more. The average primary particle size of the silica particles may be, for example, from the viewpoint of more easily forming a transparent water-repellent portion, 200 nm or less, 150 nm or less, or 100 nm or less. From these viewpoints, the average primary particle size of the silica particles may be, for example, 1 to 200 nm, 5 to 150 nm, or 20 to 100 nm. The silica particles may be particles having a hollow structure, a porous structure, or the like.

The average particle size of the silica particles can be measured from the raw material. For example, a two-axis average primary particle size is calculated as follows from the result of observing 20 arbitrary particles by SEM. That is, for example, in the case of colloidal silica particles having a solid content concentration of 5 to 40% by mass usually dispersed in water, a chip obtained by cutting a wafer with pattern wiring into 2-cm squares is soaked in a dispersion of the colloidal silica particles for about 30 seconds, then the chip is rinsed with pure water for about 30 seconds, and blown dry with nitrogen. Then, the chip is placed on a sample stage for SEM observation, an acceleration voltage of 10 kV is applied, the silica particles are observed at a magnification of 100000×, and an image is photographed. Twenty silica particles are arbitrarily selected from the obtained image, and the average of the particle size of those particles is taken as the average particle size. In this case, when the selected silica particles are a shape as illustrated in FIG. 1, a rectangle (circumscribed rectangle L) is derived by circumscribing a silica particle P such that the long side of the rectangle is the maximum possible length. Then, assuming that the long side of the circumscribed rectangle L is X and the short side is Y, the two-axis average primary particle size is calculated as (X+Y)/2, and taken as the particle size of the particle.

The number of silanol groups per g of the above-mentioned silica particles may be, for example, from the viewpoint of having excellent reactivity and easily imparting excellent water repellency and adhesiveness at low temperature and in a short time, $10 \times 10^{18}$ groups/g or more, $50 \times 10^{18}$ groups/g or more, or $100 \times 10^{18}$ groups/g or more. The number of silanol groups per g of the silica particles may be, for example, from the viewpoint of easily suppressing sudden gelation during treatment and forming a uniform water-repellent portion, $1000 \times 10^{18}$ groups/g or less, $800 \times 10^{18}$ groups/g or less, or $700 \times 10^{18}$ groups/g or less. From these viewpoints, the number of silanol groups per g of the silica particles may be, for example, $0 \times 10^{18}$ to $1000 \times 10^{18}$ groups/g, $50 \times 10^{18}$ to $800 \times 10^{18}$ groups/g, or $100 \times 10^{18}$ to $700 \times 10^{18}$ groups/g.

The content of the silica particles may be, for example, from the viewpoint of improving the reactivity of the treatment agent and from the viewpoint of easily imparting excellent water repellency and adhesiveness at low temperature and in a short time, per 100 parts by mass of the total amount of the liquid composition, 0.01 parts by mass or more, 0.1 parts by mass or more, or 0.5 parts by mass or more. The content of the silica particles may be, for example, from the viewpoint of more easily forming a water-repellent portion having an appropriate hardness and the viewpoint of more easily improving durability against thermal shocks and scratches, per 100 parts by mass of the total amount of the liquid composition, 30 parts by mass or less, 20 parts by mass or less, or 10 parts by mass or less. From these viewpoints, the content of the silica particles may be, for example, per 100 parts by mass of the total amount of the liquid composition, 0.01 to 30 parts by mass, 0.1 to 20 parts by mass, or 0.5 to 10 parts by mass.

The liquid composition may further include, for example, from the viewpoint of further improving water repellency and adhesiveness, a silicon compound other than the polysiloxane compound (excluding the polysiloxane compound). Specifically, the liquid composition may further contain at least one selected from the group consisting of a silane monomer having a hydrolyzable functional group or a condensable functional group, and a hydrolyzate of the silane monomer having a hydrolyzable functional group (hereinafter, sometimes referred to as "silane monomer group"). The number of silicons in a molecule of the silane monomer can be 1 to 6.

Examples of the silane monomer having a hydrolyzable functional group include, but are not particularly limited to, alkyl silicon alkoxides. Among alkyl silicon alkoxides, a compound in which the number of hydrolyzable functional groups is 3 or less can further improve water resistance. Examples of such alkyl silicon alkoxides include monoalkyltrialkoxysilanes, monoalkyldialkoxysilanes, dialkyldialkoxysilanes, monoalkylmonoalkoxysilanes, dialkylmonoalkoxysilanes, and trialkylmonoalkoxysilanes. Specifically, examples thereof include methyltrimethoxysilane, methyldimethoxysilane, dimethyldimethoxysilane, and ethyltrimethoxysilane.

Examples of the silane monomer having a condensable functional group include, but are not particularly limited to, silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol, and trifluoropropylsilanetriol.

The silane monomer having a hydrolyzable functional group or a condensable functional group may further have the above-described reactive group different from the hydrolyzable functional group and the condensable functional group.

As a silane monomer in which the number of hydrolyzable functional groups is 3 or less and that has a reactive group, there may also be used vinyltrimethoxysilane, 3-glycidoxypropyltrimethoxysilane, 3-glycidoxypropylmethyldimethoxysilane 3-Methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane, and the like.

Further, as a silane monomer having a condensable functional group and a reactive group, there may also be used vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol, and the like.

In addition, there may also be used bistrimethoxysilylmethane, bistrimethoxysilylethane, bistrimethoxysilylhexane, ethyltrimethoxysilane, vinyltrimethoxysilane, and the like, which are silane monomers in which the number of hydrolyzable functional groups at the molecular ends is 3 or less.

These silane monomers having a hydrolyzable functional group or a condensable functional group, and hydrolyzates of a silane monomer having a hydrolyzable functional group, may be used singly or in a mixture of two or more.

In addition, since the hydrolyzable functional group such as an alkoxy group is hydrolyzed, the silane monomer having a hydrolyzable functional group may be present as a hydrolyzate in the liquid composition, and the silane monomer having a hydrolyzable functional group and a hydrolyzate thereof may both be present. Further, in the silane monomer having a hydrolyzable functional group, the hydrolyzable functional groups in the molecule may all be hydrolyzed or may be partially hydrolyzed.

The content of the polysiloxane compound group (the total of the content of the polysiloxane compound having a hydrolyzable functional group or a condensable functional group and the content of the hydrolyzate of the polysiloxane compound having a hydrolyzable functional group) may be, for example, from the viewpoint of even more easily improving water repellency, per 100 parts by mass of the total amount of the liquid composition, 0.01 parts by mass or more, 0.1 parts by mass or more, or 0.5 parts by mass or more. The content of the polysiloxane compound group may be, for example, from the viewpoint of more easily forming a water-repellent portion having an appropriate hardness and the viewpoint of more easily improving durability against thermal shocks and scratches, per 100 parts by mass of the total amount of the liquid composition, 50 parts by mass or less, 30 parts by mass or less, or 10 parts by mass or less. From these viewpoints, the content of the polysiloxane compound group may be, for example, per 100 parts by mass of the total amount of the liquid composition, 0.01 to 50 parts by mass, 0.1 to 30 parts by mass, or 0.5 to 10 parts by mass.

When the treatment agent of the present embodiment further contains a silane monomer group in the liquid composition, the ratio between the content of the polysiloxane compound group and the content of the silane monomer group (the total of the content of the silane monomer having a hydrolyzable functional group or a condensable functional group and the content of the hydrolyzate of the silane monomer having a hydrolyzable functional group) may be, for example, from the viewpoint of even more easily improving water repellency and easily obtaining good compatibility, 1:0.1 or more, or 1:1 or more. The ratio between the contents of these compounds may be, from the viewpoint of easily forming a water-repellent portion having an appropriate hardness and the viewpoint of more easily improving durability against thermal shocks and scratches, for example, 1:10 or less, or 1:5 or less. From these viewpoints, the ratio between the content of the polysiloxane compound group and the content of the silane monomer group may be, for example, 1:0.1 to 1:10, or 1:1 to 1:5.

The total content of the polysiloxane compound group and the silane monomer group may be, from the viewpoint of even more easily improving of water repellency, per 100 parts by mass of the total amount of the liquid composition, for example, 0.01 parts by mass or more, 0.1 parts by mass or more, or 0.5 parts by mass or more. This total content may be, from the viewpoint of more easily forming a water-repellent portion having an appropriate hardness and the viewpoint of more easily improving durability against thermal shocks and scratches, per 100 parts by mass of the total amount of the liquid composition, for example, 60 parts by mass or less, 30 parts by mass or less, 20 parts by mass or less, or 10 parts by mass or less. From these viewpoints, the total content of the polysiloxane compound group and the silane monomer group may be, per 100 parts by mass of the total amount of the liquid composition, for example, 0.1 to 60 parts by mass, 0.01 to 30 parts by mass, 0.1 to 20 parts by mass, or 0.5 to 10 parts by mass. At this time, the ratio of the content of the polysiloxane compound group and the content of the silane monomer group can be in the above range.

The treatment agent of the present embodiment may include aerogel particles from the viewpoint of improving water repellency. That is, the liquid composition may contain aerogel particles and at least one selected from the group consisting of a polysiloxane compound having a hydrolyzable functional group or a condensable functional group and a hydrolyzate of the polysiloxane compound having a hydrolyzable functional group. An aerogel is a porous body having nanometer-sized fine pores. Aerogel particles are considered to exhibit excellent water repellency because there are few hydroxyl groups on their surface and because it is difficult for water to enter into the fine pores.

As the aerogel particles, conventionally known aerogel particles can be used without particular limitation, but aerogel particles formed by using as a raw material the polysiloxane compound, the silane monomer, or the like contained in the liquid composition may also be used. Such an aerogel (particles) can be obtained by drying a wet gel which is a condensation product of a sol containing the polysiloxane compound and the like.

The average primary particle size of the aerogel particles may be, from the viewpoint of easily obtaining good water repellency, for example, 0.1 to 10000 nm, 1 to 1000 nm, or 2 to 100 nm.

The content of the aerogel particles may be, from the viewpoint of easily obtaining good dispersibility, per 100 parts by mass of the total amount of the liquid composition, for example, 0.1 to 10 parts by mass, 0.5 to 5 parts by mass, or 0.8 to 3 parts by mass.

The treatment agent according to another embodiment may be an aspect including a water-repellent component. The water-repellent component may be, for example, a condensation product of the liquid composition described above. Hereinafter, specific aspects of treatment agents containing a water-repellent component will be described as second to fourth aspects.

(Second Aspect)

The treatment agent of the present embodiment can include a water-repellent component containing a polysiloxane having a main chain including a siloxane bond (Si—O—Si). The water-repellent component can have the following M unit, D unit, T unit, or Q unit as a structural unit.

[Chemical Formula 8]

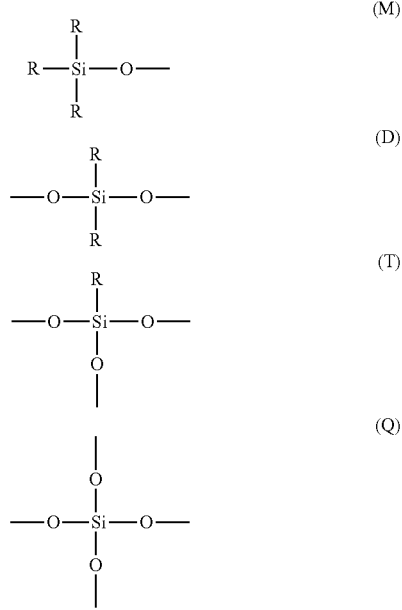

In the above formula, R represents an atom (e.g., a hydrogen atom) or an atomic group (e.g., an alkyl group) bonded to a silicon atom. The M unit is a unit consisting of a monovalent group in which a silicon atom is bonded to one oxygen atom. The D unit is a unit consisting of a divalent group in which a silicon atom is bonded to two oxygen atoms. The T unit is a unit consisting of a trivalent group in which a silicon atom is bonded to three oxygen atoms. The Q unit is a unit consisting of a tetravalent group in which a silicon atom is bonded to four oxygen atoms. Information on the content of these units can be obtained by Si-NMR.

The treatment agent of the present embodiment may contain a water-repellent component having, in solid $^{29}$Si-NMR spectra as measured by using the DD/MAS method, when the silicon-containing bonding units Q, T, and D are defined as follows, the ratio Q+T:D between the signal area derived from Q and T and the signal area derived from D of 1:0.01 to 1:1.00.

Q: A silicon-containing bonding unit comprising four oxygen atoms that are bonded to one silicon atom.

T: A silicon-containing bonding unit comprising three oxygen atoms and one hydrogen atom or one monovalent organic group that are bonded to one silicon atom.

D: A silicon-containing bonding unit comprising two oxygen atoms and two hydrogen atoms or two monovalent organic groups that are bonded to one silicon atom.

However, the organic group is a monovalent organic group in which an atom bonded to the silicon atom is a carbon atom.

Such a treatment agent is excellent in water repellency and thermal insulation properties, and also excellent in adhesiveness with particles.

The ratio Q+T:D between a signal area derived from Q and T and a signal area derived from D may be, for example, 1:0.01 to 1:0.70, 1:0.01 to 1:0.50, 1:0.02 to 1:0.50, or 1:0.03 to 1:0.50. By setting the signal area ratio to 1:0.01 or more, better water repellency tends to be obtained, and by setting the signal area ratio to 1:0.70 or less, more excellent adhesiveness tends to be obtained.

Note that an "oxygen atom" in Q, T, and D as described below is mainly an oxygen atom connecting between two silicon atoms, but, for example, a case where it is an oxygen atom that is possessed by a hydroxyl group and is bonded to a silicon atom is also conceivable. Also, an "organic group" is a monovalent organic group where the atom that is bonded to the silicon atom is a carbon atom. Examples of such a group include an unsubstituted or substituted monovalent organic group in which the number of carbon atoms is 1 to 10. Examples of the unsubstituted monovalent organic group include hydrocarbon groups such as an alkyl group, an alkenyl group, an alkynyl group, a cycloalkyl group, an aryl group, and an aralkyl group. Examples of the substituted monovalent organic group include hydrocarbon groups (substituted organic groups) in which a hydrogen atom of the above-mentioned hydrocarbon groups is substituted by a halogen atom, a predetermined functional group, a predetermined functional group-containing organic group, or the like, or, hydrocarbon groups in which particularly a hydrogen atom of a ring of a cycloalkyl group, an aryl group, an aralkyl group, or the like, is substituted by an alkyl group. Examples of the halogen atoms include a chlorine atom and a fluorine atom (namely, atoms which produce a halogen atom-substituted organic group such as a chloroalkyl group or a polyfluoroalkyl group). Examples of the functional group include a hydroxyl group, a mercapto group, a carboxyl group, an amino group, an epoxy group, a cyano group, an acryloyloxy group, and a methacryloyloxy group. Examples of the functional group-containing organic group include an alkoxy group, an acyl group, an acyloxy group, an alkoxycarbonyl group, a glycidyl group, an epoxy cyclohexyl group, an alkylamino group, a dialkylamino group, an arylamino group, and an N-aminoalkyl substituted aminoalkyl group.

The signal area ratio can be confirmed based on solid $^{29}$Si-NMR spectra. In general, the measurement technique for the solid $^{29}$Si-NMR spectra is not particularly limited; examples thereof may include a CP/MAS method and a DD/MAS method; in the present embodiment, the DD/MAS method is employed from the viewpoint of quantitativity.

Chemical shifts of the silicon-containing bonding units Q, T, and D in the solid $^{29}$Si-NMR spectra are, respectively, observed in the region of −90 to −120 ppm for the Q unit, −45 to −80 ppm for the T unit, and 0 to −40 ppm for the D unit. Therefore, it is possible to separate the signals of the silicon-containing bonding units Q, T, and D, and to calculate the signal area derived from each unit. Note that in analyzing the spectra, it is possible to, from the viewpoint of improving analytical accuracy, employ the exponential function as the Window function and at the same time to set the line broadening coefficient in a range of 0 to 50 Hz.

Figure 2:
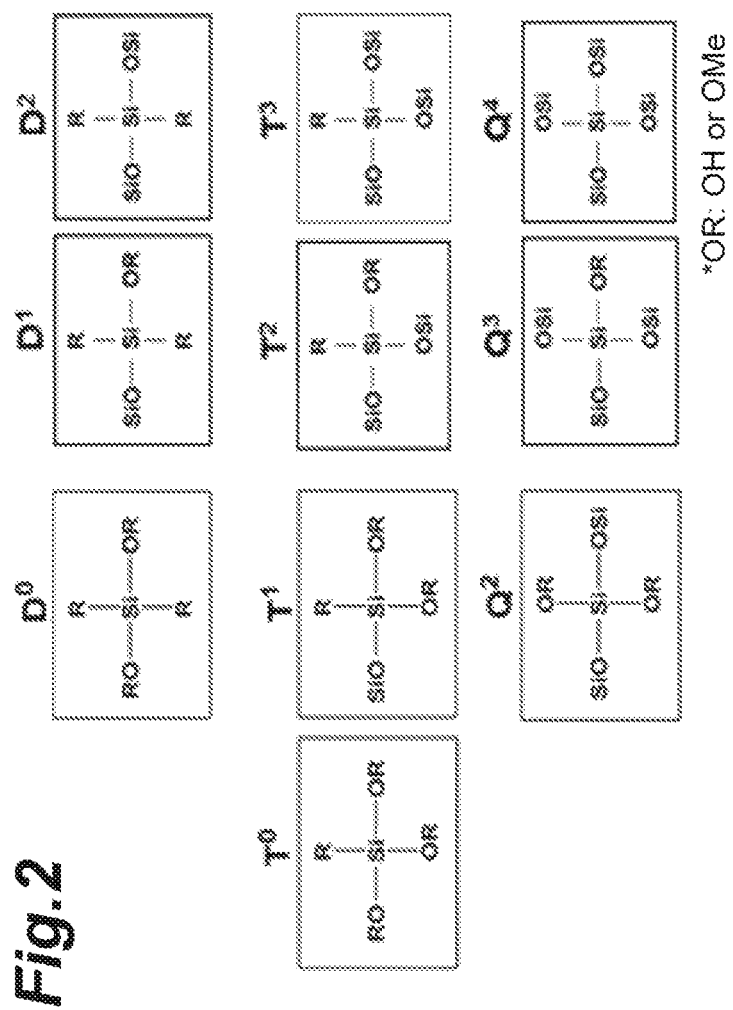
FIG. 2 is a diagram illustrating an example of a solid $^{29}$Si-NMR spectrum of a water-repellent portion according to the present embodiment.
Figure 2:
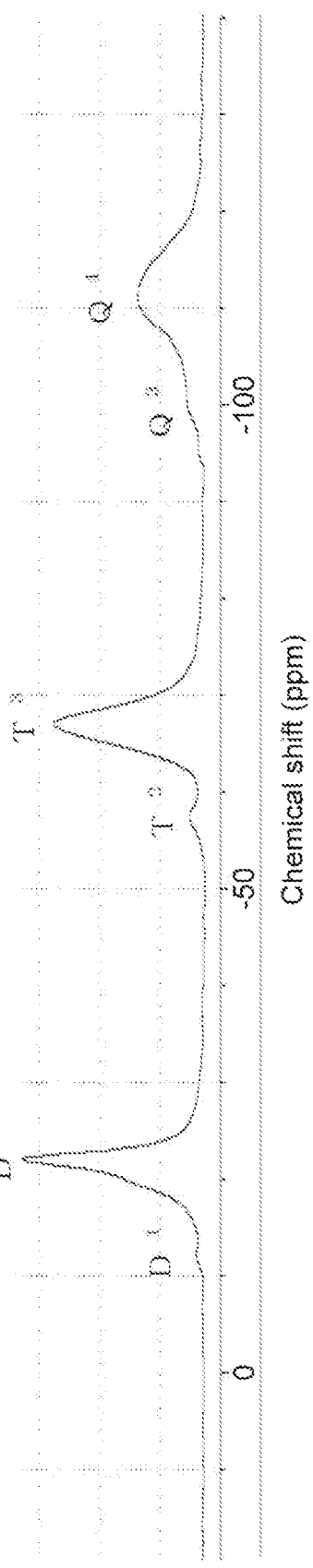

For example, FIG. 2 is a diagram illustrating an example of a solid $^{29}$Si-NMR spectrum of a water-repellent portion (described later in Example 5) according to the present embodiment measured using a DD/MAS method. As illustrated in FIG. 2, the signals of the silicon-containing bonding units Q, T, and D can be separated based on the solid $^{29}$Si-NMR spectra using the DD/MAS method.

Here, the method of calculating the signal area ratio will be described with reference to FIG. 2. For example, in FIG. 2, the Q unit signal derived from silica is observed in the chemical shift range of −90 to −120 ppm. Also, the T unit signal derived from the polysiloxane compound and the trimethoxysilane reaction product is observed in the chemical shift range of −45 to −80 ppm. In addition, the D unit signal derived from the polysiloxane compound and the dimethyldimethoxysilane reaction product is observed in the chemical shift range of 0 to −40 ppm. Signal areas (integrated values) are obtained by integrating the signals in the respective chemical shift ranges. When the signal area of the sum of the Q unit and the T unit is set as 1, the signal area ratio of Q+T:D in FIG. 2 is calculated to be 1:0.42. Note that the signal areas are calculated by using general spectrum analysis software (such as NMR software "TopSpin" manufactured by Bruker (TopSpin is a registered trademark)).

(Third Aspect)

The treatment agent of the present embodiment may contain a water-repellent component including a compound having a structure represented by the following formula (1). The water-repellent component according to the present embodiment can include a compound having a structure represented by the following formula (1a) as a structure including the structure represented by formula (1). For example, the condensation product of the liquid composition including a polysiloxane compound having a structure represented by the above formula (A) can include a water-repellent component including a compound having a structure represented by formula (1) and formula (1a) in its skeleton.

[Chemical Formula 9]

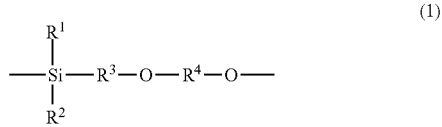

(1)

[Chemical Formula 10]

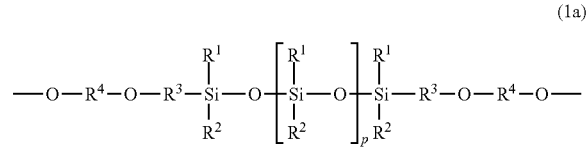

(1a)

In formulas (1) and (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. In addition, examples of a substituent of the substituted phenyl group include an alkyl group, a vinyl group, a mercapto group, an amino group, a nitro group, and a cyano group. p represents an integer of 1 to 50. In formula (1a), two or more $R^1$ may be the same as or different from each other, and similarly, two or more $R^2$ may be the same as or different from each other. In formula (1a), two $R^3$ may be the same as or different from each other, and similarly, two $R^4$ may be the same as or different from each other.

When the treatment agent contains a water-repellent component including a compound having a structure represented by the above formula (1) or formula (1a), water repellency and adhesiveness are further improved. From such viewpoint, in formulas (1) and (1a), examples of $R^1$ and $R^2$ include, each independently, represent an alkyl group in which the number of carbon atoms is 1 to 6 and phenyl group; examples of the alkyl group include a methyl group. In formulas (1) and (1a), examples of include, $R^3$ and $R^4$ each independently, an alkylene group in which the number of carbon atoms is 1 to 6; examples of the alkylene group include an ethylene group and a propylene group. In formula (1a), for example, p may be 2 to 30, or 5 to 20.

(Fourth Aspect)

The treatment agent of the present embodiment may have a ladder structure comprising strut portions and bridge portions. The bridge portions may contain a water-repellent component including a compound represented by the following formula (2). By including such a compound having a ladder structure in its skeleton, the water-repellent component can further improve water repellency, as well as improve mechanical strength. That is, the treatment agent of the present embodiment has excellent water repellency and durability due to the ladder structure. For example, the condensation product of the liquid composition including a polysiloxane compound having a structure represented by the above formula (B) may include a water-repellent component including a compound having in its skeleton a ladder structure having a bridge portion represented by formula (2). In the present embodiment, a "ladder structure" is a structure having two strut portions (struts) and bridge portions (bridges) connecting the strut portions to each other (i.e., a structure having a so-called "hashigo" (ladder) form). In this aspect, the ladder structure may be an aspect included in a part of the compound.

[Chemical Formula 11]

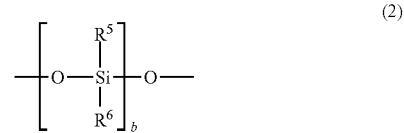

(2)

In formula (2), $R^5$ and $R^6$ each independently represent an alkyl group or an aryl group, and b represents an integer of 1 to 50. Here, examples of the aryl group include a phenyl group and a substituted phenyl group. Further, examples of a substituent of the substituted phenyl group include an alkyl group, a vinyl group, a mercapto group, an amino group, a nitro group, and a cyano group. In addition, in formula (2), when b is an integer of 2 or more, two or more $R^5$ may be the same as or different from each other, and similarly, two or more $R^6$ may also be the same as or different from each other.

The structure serving as the strut portion and the chain length thereof, and the spacing between the structures serving as the bridge portion, are not particularly limited; however, from the viewpoint of further improving water repellency, mechanical strength, and durability, examples of the ladder structure include the ladder structure represented by the following formula (3).

[Chemical Formula 12]

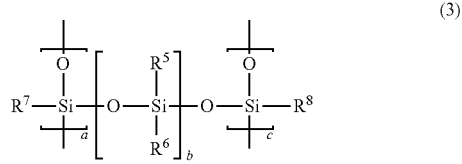

(3)

In formula (3), $R^5$, $R^6$, $R^7$, and $R^8$ each independently represent an alkyl group or an aryl group, a and c each independently represent an integer of 1 to 3000, and b represents an integer of 1 to 50. Here, examples of the aryl group include a phenyl group and a substituted phenyl group. Further, examples of a substituent of the substituted phenyl group include an alkyl group, a vinyl group, a mercapto group, an amino group, a nitro group, and a cyano group. In addition, in formula (3), when b is an integer of 2 or more, two or more $R^5$ may be the same as or different from each other, and similarly, two or more $R^6$ may also be the same as or different from each other. Still further, in formula (3), when b is an integer of 2 or more, two or more $R^7$ may be the same as or different from each other, and similarly, when c is an integer of 2 or more, two or more $R^8$ may be the same as or different from each other.

From the viewpoint of obtaining even better water repellency, in formulas (2) and (3), examples of $R^5$, $R^6$, $R^7$, and $R^8$ (wherein $R^7$ and $R^8$ are only in formula (3)) include, each independently, an alkyl group in which the number of carbon atoms is 1 to 6 and a phenyl group; examples of the alkyl group include a methyl group. In formula (3), a and c may each independently be, for example, 6 to 2000, or 10 to 1000. Further, in formulas (2) and (3), b may be, for example, 2 to 30, or 5 to 20.

From the viewpoint of further improving water repellency, the water-repellent portion formed on the surface to be treated of the particles may contain an aerogel. The water-repellent component contained in the treatment agent may be constituted from, for example, an aerogel from the viewpoint of further improving water repellency. Since an aerogel has a large porosity, it is considered that a water-repellent component (and water-repellent portion formed therefrom) composed of an aerogel has a small refractive index and high transparency.

The treatment agent of the present embodiment described above can be used to treat particles. The particles to be treated include, for example, inorganic particles and organic particles. The type of particles is not particularly limited as long as the effects of the present invention are not impaired.

Examples of the inorganic particles include: inorganic powders of iron, aluminum, zinc, nickel, copper, tin, stainless steel, ceramic, sand, carbon black, graphite, and the like; silicates such as magnesium silicate, aluminum silicate, zinc silicate, silica, talc, quartz, and mica; phosphates such as calcium phosphate, magnesium phosphate, zinc phosphate, and aluminum phosphate; carbonates such as calcium carbonate, magnesium carbonate, and barium carbonate; sulfates such as calcium sulfate, magnesium sulfate, barium sulfate, and sodium sulfate; borates such as borax; chlorides such as sodium chloride, calcium chloride, and magnesium chloride; hydroxides such as calcium hydroxide, aluminum hydroxide, and chromium hydroxide; oxides such as iron oxide, aluminum oxide, titanium oxide, magnesium oxide, zirconium oxide, zinc oxide, and cerium oxide; sulfides such as zinc sulfide, calcium sulfide, and strontium sulfide; nitrides such as boron nitride, titanium nitride, and silicon nitride; and anhydrous or hydrated particle forms thereof. The inorganic particles may be particles obtained by complexing these inorganic particles, or may be particles coated with an organic compound or an inorganic compound.

Among these, from the viewpoint of handling safety and economic efficiency, inorganic powders of sand, carbon black, and graphite; silicates, and oxides are preferable. Carbon black, silica, sand and aluminum oxide are preferable because these are capable of imparting at least one of conductivity, dimensional stability, and toughness as an effect of the particles.

Examples of the organic particles include: silicon resin particles, polyimide resin particles, acrylic resin particles, urethane resin particles, polyester resin particles, nylon resin particles, styrene resin particles, polyethylene resin particles, phenol resin particles, epoxy resin particles, melamine resin particles, urea resin particles, benzoguanamine resin particles, and fluorine resin particles. The organic particles may be cross-linked polymer particles, particles formed by complexing with these organic particles, or particles coated with an organic compound or an inorganic compound.

Among these, acrylic resin particles, polyimide resin particles, and silicon resin particles are preferable because these are capable of imparting at least one of transparency, heat resistance, and flexibility as an effect of the particles.

The particle size (average size), the cross-sectional shape, and surface shape of the particles are not particularly limited, and can be appropriately selected according to the purpose of imparting water repellency. For example, in the case of glass beads, the particle size may be about 0.1 to 3000 μm, or about 10 to 1000 μm. As used herein, the term particle size refers to the diameter of a circle of the same area as the cross-sectional area of the particle.

Next, the water-repellent particles obtained by using the above-mentioned treatment agent will be described.

<Water-Repellent Particles>

The water-repellent particles of the present embodiment are obtained by treating the particles with the above-mentioned treatment agent. Such water-repellent particles are excellent in water repellency without deteriorating the characteristics of the particles. The water-repellent particles according to one embodiment have a water-repellent portion formed on a surface to be treated of the particle, and the water-repellent portion includes a dried product of the treatment agent. If the treatment agent includes a condensation product of the above-mentioned liquid composition, it is considered that the condensation reaction further proceeds when the water-repellent portion is formed; in addition, if the treatment agent is the above liquid composition itself, it is considered that a condensation reaction occur when the water-repellent portion is formed. Therefore, it can be said that the water-repellent portion includes a reaction product of the treatment agent.

The water-repellent portion may be a form including at least one of a film shape and a particle shape. The water-repellent particles of the present embodiment are excellent in water repellency and also excellent in adhesiveness between the surface to be treated and the water-repellent portion due to having a water-repellent portion including a dried product of the treatment agent of the present embodiment. Such water-repellent particles are also excellent in durability. The water-repellent particles of the present embodiment may be, for example, particles formed from a film-like and/or particulate water-repellent portion on the surface to be treated of the particles by using the above-mentioned treatment agent. Here, a preferred form of the water-repellent portion formed on the surface to be treated is the same as the form described above as the water-repellent component contained in the treatment agent. Specifically, the water-repellent particles of the present embodiment may comprise, for example, a water-repellent portion including a compound having a structure represented by the above formula (1), or comprise a water-repellent portion having a ladder structure provided with strut portions and bridge portions, in which the bridge portions contain a compound represented by the following formula (2), or comprise a water-repellent portion containing a compound having a structure represented by the above formula (3).

From the viewpoint of further improving water repellency, the water-repellent portion (a water-repellent film, water-repellent particles, etc.) formed on the surface to be treated of the water-repellent particles may contain an aerogel. That is, for example, the water-repellent film and the water-repellent particles formed on the surface to be treated may respectively be a film containing an aerogel or particles containing an aerogel.

Figure 3:
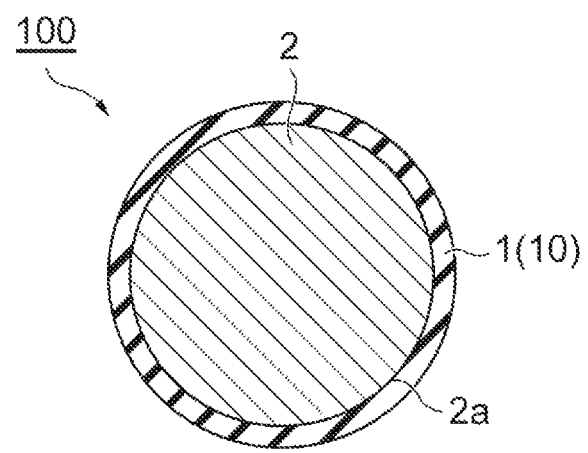
FIG. 3 is a diagram schematically illustrating a water-repellent particle according to an embodiment of the present invention.

FIG. 3 is a diagram schematically illustrating a particle (water-repellent particle) according to an embodiment of the present invention. A water-repellent particle 100 illustrated in FIG. 3 has a structure in which a water-repellent portion 10 consisting of a film-like water-repellent portion 1 is formed on a surface 2a to be treated of the particle 2. Here, the water-repellent portion 10 includes a dried product of the treatment agent of the present embodiment. It is considered that through the inclusion of the water-repellent portion 10 consisting of the film-like water-repellent portion 1 on the surface 2a to be treated, the water-repellent particle 100 is imparted with water repellency, which is a chemical property of the water-repellent portion. Here, it can be said that the water-repellent portion in the present aspect is not a monolithic film, but is a film formed by deposition of minute water-repellent particles (water-repellent components).

Figure 4:
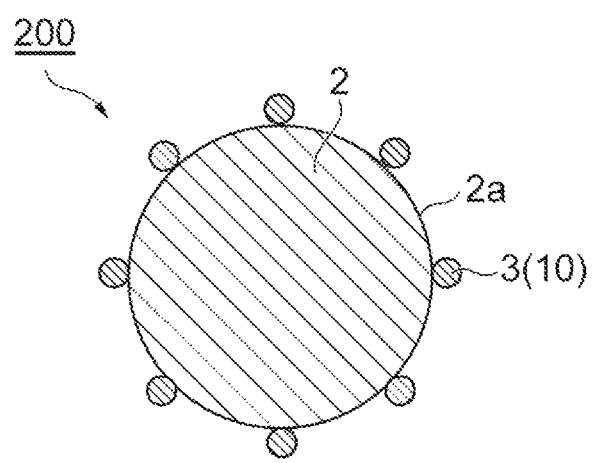
FIG. 4 is a diagram schematically illustrating a water-repellent particle according to an embodiment of the present invention.

FIG. 4 is a diagram schematically illustrating a particle (water-repellent particle) according to an embodiment of the present invention. A water-repellent particle 200 illustrated in FIG. 4 has a structure in which the water-repellent portion 10 consisting of a particulate water-repellent portion 3 is formed on the surface 2a to be treated of the particle 2. Here, the water-repellent portion 10 includes a dried product of the treatment agent of the present embodiment. It is considered that through the inclusion of the water-repellent portion 10 consisting of the particulate water-repellent portion 3 on the surface 2a to be treated, a Lotus effect, which is a physical property of the water-repellent portion, is obtained due to fine uneven shapes, whereby the water-repellent particle 200 is imparted with high water repellency. Here, it can be said that the water-repellent portion in the present aspect is formed by water-repellent particles (water-repellent components) that have grown to a certain size adhering to the surface to be treated.

Figure 5:
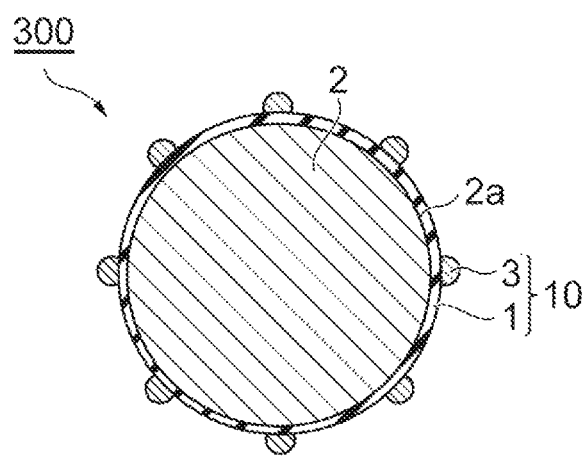
FIG. 5 is a diagram schematically illustrating a water-repellent particle according to an embodiment of the present invention.

FIG. 5 is a diagram schematically illustrating a water-repellent particle according to an embodiment of the present invention. A water-repellent particle 300 illustrated in FIG. 5 has a structure in which the water-repellent portion 10 comprising a film-like water-repellent portion 1 and a particulate water-repellent portion 3 is formed on the surface 2a to be treated of the particle 2. Here, the water-repellent portion 10 includes a dried product of the treatment agent of the present embodiment. It is considered that through the inclusion of the water-repellent portion 10 including the film-like water-repellent portion 1 and the particulate water-repellent portion 3 on the surface 2a to be treated, the water-repellent particle 300 is imparted with water repellency, which is a chemical property of the water-repellent portion, and a Lotus effect, which is a physical property of the water-repellent portion, is obtained due to fine uneven shapes, whereby the water-repellent particle 300 is imparted with even better water repellency.

As especially above, a water-repellent portion having various aspects can be obtained depending on the size of the particles formed from the treatment agent. Specifically, when the water-repellent particles are minute, a water-repellent portion is formed in an aspect with a film-like appearance in which the particles have been deposited to a predetermined thickness, and when the water-repellent particles are large to a certain extent, a water-repellent portion is formed in an aspect with a particulate appearance in which the particles are individually arranged in a plane. When minute and large water-repellent particles are both present, a water-repellent portion is formed in an aspect with a composite appearance.

It is noted that, in FIGS. 3 to 5, water repellent particles in which the surface 2a to be treated of the particle 2 has been treated with the treatment agent are illustrated, but this is not meant to exclude an aspect in which the inside of the particle 2 has been treated with the treatment agent. Specifically, when the particle 2 is a porous body having communicating holes, the dried product of the treatment agent may be included not only on the surface, but also inside the particle 2 (may be a part of the inside of the particle 2).

In the water-repellent particles of the present embodiment, the thickness of the film-like water-repellent portion may be, for example, 1 to 500 nm, or 20 to 200 nm. By setting the thickness to 1 nm or more, even better water repellency can be achieved, and by setting the thickness to 500 nm or less, even better adhesiveness can be achieved.

In the water-repellent particle of the present embodiment, the particle size of the particulate water-repellent portion may be, for example, 0.1 to 10000 nm, or 1 to 1000 nm. By setting the size of the water-repellent portion to 0.1 nm or more, even better water repellency can be achieved, and by setting the size to 10000 nm or less, even better adhesiveness can be achieved.

In view of the above, in the water-repellent particles of the present embodiment, the thickness of the water-repellent portion may be, for example, 1 to 10000 nm, or 20 to 1000 nm.

In the water-repellent particles of the present embodiment, an apparent surface area of the particle in the portion where the water-repellent portion is formed may be, from the viewpoint of further improving water repellency, based on the apparent surface area of an untreated particle, 20% or more, or 50% or more. The apparent surface area refers to, for example, the surface area of the particle calculated by observation using a scanning electron microscope (SEM).

<Production Method of Water-Repellent Particles>

Next, a method of producing the water-repellent particles will be described. The water-repellent particles according to the present embodiment are produced by treating the particles with the treatment agent of the present embodiment. According to such a production method, water-repellent particles having excellent water repellency without impairing the characteristics of the particles can be produced.

Hereinafter, specific examples of the production method of the treatment agent and the method for treating the particles will be described.

[Production Method of Treatment Agent]

The production method of the treatment agent is not particularly limited, but the treatment agent can be produced, for example, by the following method.

The treatment agent of the present embodiment can be produced, for example, by a production method mainly comprising a blending step and a condensation reaction step.

Hereinafter, each step of the method for producing the treatment agent of the present embodiment will be described.

(Blending Step)

The blending step is a step of mixing the above-mentioned polysiloxane compound and, optionally, silica particles, silane monomer, solvent, and the like. As a result of this step, a hydrolysis reaction of a silicon compound such as a polysiloxane compound can be performed. The silica particles may be mixed in a dispersion dispersed in a solvent. In this step, an acid catalyst may be further added to the solvent to accelerate the hydrolysis reaction. Further, a surfactant can also be added to the solvent. When using a silicon compound having a condensable functional group, the hydrolysis reaction is not necessarily essential.

Examples of the solvent that can be used include water or a mixed solution of water and alcohols. Examples of the alcohols include methanol, ethanol, n-propanol, 2-propanol, n-butanol, 2-butanol, and t-butanol. From the viewpoint of reducing the interfacial tension with the surface to be treated of the particles, the alcohols may be solvents having, for example, a low surface tension and a low boiling point. Examples of alcohols in which the surface tension is low and the boiling point is low include methanol, ethanol, and 2-propanol. These may be used singly or in a mixture of two or more.

Examples of the acid catalysts include: inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acid phosphates such as acid aluminum phosphate, acid magnesium phosphate, and acid zinc phosphate; and organic carboxylic acids such as acetic acid, formic acid, propionic acid, oxalic acid, malonic acid, succinic acid, citric acid, malic acid, adipic acid, and azelaic acid. Among these, in consideration of environmental pollution, examples of the acid catalysts capable of accelerating the hydrolysis reaction include organic carboxylic acids. Examples of the organic carboxylic acids include an acetic acid, but formic acid, propionic acid, oxalic acid, malonic acid, or the like can also be used. These may be used singly or in a mixture of two or more.

Use of the acid catalyst accelerates the hydrolysis reaction of the polysiloxane compound and the silane monomer, and thus, allows the hydrolyzed solution to be obtained in a shorter time.

The added amount of the acid catalyst can be, for example, 0.001 to 600.0 parts by mass per 100 parts by mass of the total amount of the polysiloxane compound group and the silane monomer group.

As the surfactant, a non-ionic surfactant, an ionic surfactant, and the like can be used. These may be used singly or in a mixture of two or more.

Examples of the non-ionic surfactant that can be used include compounds containing a hydrophilic portion such as polyoxyethylene and a hydrophobic portion principally consisting of an alkyl group and compounds containing a hydrophilic portion such as polyoxypropylene. Examples of the compounds containing a hydrophilic portion such as polyoxyethylene and a hydrophobic portion principally consisting of an alkyl group include polyoxyethylenenonyl phenyl ether, polyoxyethyleneoctyl phenyl ether, and polyoxyethylene alkyl ether. Examples of compounds containing a hydrophilic portion such as polyoxypropylene include polyoxypropylenealkyl ether and a block copolymer of polyoxyethylene with polyoxypropylene.

Examples of the ionic surfactant include a cationic surfactant, an anionic surfactant, and an amphoteric surfactant. Examples of the cationic surfactant include bromocetyltrimethyl ammonium, and chlorocetyltrimethyl ammonium; Examples of the anionic surfactant include sodium dodecyl sulfonate. Further, examples of the amphoteric surfactant include an amino acid type surfactant, a betaine type surfactant, and an amine oxide type surfactant. Examples of the amino acid type surfactant include acylglutamic acid. Examples of the betaine type surfactant include lauryldimethylaminoacetic acid betaine and stearyldimethylaminoacetic acid betaine. Examples of the amine oxide type surfactant include lauryldimethylamine oxide.

These surfactants are considered to have an action of improving the dispersibility of the polysiloxane compound in the solvent, and on occasion the dispersibility of the silica particles, silane monomer, and the like, in the solvent in the blending step. Further, these surfactants are considered to have an action of reducing differences in chemical compatibility between the solvent in the reaction system and the growing siloxane polymer in the condensation reaction step to be described later, thereby improving dispersibility.

The added amount of the surfactant depends on the kind of the surfactant or on the kinds and amounts of the polysiloxane compound and the silane monomer; however, the added amount thereof may be, for example, per 100 parts by mass of the total amount of the polysiloxane compound group and the silane monomer group, 1 to 100 parts by mass, or 5 to 60 parts by mass.

The hydrolysis in the blending step depends on the kinds and amounts of the polysiloxane compound, the silane monomer, the silica particles, the acid catalyst, the surfactant, and the like in the mixed solution; however, the hydrolysis may, for example, be conducted for 10 minutes to 24 hours under a temperature environment of 20 to 60° C., or for 5 minutes to 8 hours under a temperature environment of 50 to 60° C. By conducting the hydrolysis in this manner, the hydrolyzable functional groups in the polysiloxane compound and the silane monomer are sufficiently hydrolyzed, and the hydrolyzate of the polysiloxane compound and the hydrolyzate of the silane monomer can be obtained more reliably.

In the blending step, a treatment agent can be obtained that includes a liquid composition containing at least one selected from the group consisting of a polysiloxane compound having a hydrolyzable functional group or a condensable functional group, and a hydrolyzate of the polysiloxane compound having a hydrolyzable functional group.

(Condensation Reaction Step)

In the condensation reaction step, it is possible to perform a condensation reaction of the polysiloxane compound having a condensable functional group, the silane monomer, the hydrolysis reaction product obtained in the blending step, and the like. In this step, a base catalyst can be used to accelerate the condensation reaction. Moreover, in this step, a thermally hydrolyzable compound which generates a base catalyst by thermal hydrolysis can also be added.

Examples of the base catalyst include: alkaline metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic sodium phosphate salts such as sodium metaphosphate, sodium pyrophosphate, and sodium polyphosphate; carbonate salts such as calcium carbonate, potassium carbonate, sodium carbonate, barium carbonate, magnesium carbonate, lithium carbonate, ammonium carbonate, copper(II) carbonate, iron(II) carbonate, and silver(I) carbonate; bicarbonate salts such as calcium bicarbonate, potassium bicarbonate, sodium bicarbonate, and ammonium bicarbonate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and a derivative thereof, piperizine and a derivative thereof, and imidazole and a derivative thereof. Among these, from the viewpoint of handling safety and odor, carbonate salts or bicarbonate salts s are preferable, and from the viewpoint of economic efficiency, sodium carbonate or sodium bicarbonate is more preferable. The above-described base catalysts may be used singly or in a mixture of two or more.

By using a base catalyst, a dehydration condensation reaction, a dealcoholization condensation reaction, or both reactions of the polysiloxane compound group, the silane monomer group, and the silica particles in the hydrolyzed solution can be accelerated, and the treatment agent can be obtained in a shorter time.

The added amount of the base catalyst may be, for example, per 100 parts by mass of the total amount of the polysiloxane compound group and the silane monomer group, 0.1 to 500 parts by mass, or 1.0 to 200 parts by mass. By setting the added amount of the base catalyst to 0.1 parts by mass or more, the condensation reaction can be performed in a shorter time, and by setting the added amount to 500 parts by mass or less, layer separation is suppressed more easily.

The thermally hydrolyzable compound is considered to generate a base catalyst by thermal hydrolysis, causing the reaction solution to become basic, thereby accelerating the condensation reaction. Therefore, the thermally hydrolyzable compound is not particularly limited as long as it is a compound which can make the reaction solution basic after thermal hydrolysis; examples thereof include: urea; acid amides such as formamide, N-methylformamide, N,N-dimethylformamide, acetamide, N-methylacetamide, and N,N-dimethylacetamide; cyclic nitrogen compounds such as hexamethylenetetramine. Among these, it is particularly easy for urea to obtain the above-mentioned acceleration effect.

The added amount of the thermally hydrolyzable compound is not particularly limited as long as it is an amount capable of sufficiently accelerating the condensation reaction. For example, when urea is used as the thermally hydrolyzable compound, the added amount thereof may be, per 100 parts by mass of the total amount of the polysiloxane compound group and the silane monomer group, 1 to 200 parts by mass, or 2 to 150 parts by mass. By setting the added amount to 1 part by mass or more, good reactivity can be obtained more easily, and by setting the added amount to 200 parts by mass or less, layer separation is suppressed more easily.

The reaction in the condensation reaction step may be conducted in a sealed vessel so that the solvent and the base catalyst do not volatilize. The reaction temperature may be, for example, 20 to 90° C., or 40 to 80° C. By setting the reaction temperature to 20° C. or more, the condensation reaction can be performed in a shorter time. Further, by setting the reaction temperature to 90° C. or less, volatilization of the solvent (particularly alcohols) is more easily suppressed, and as a result the condensation reaction can be performed while suppressing layer separation.

The condensation reaction time depends on the kind of the polysiloxane compound group, the silane monomer group, and the like, and the reaction temperature, but may be, for example, 2 to 480 hours, or 6 to 120 hours. By setting the reaction time to 2 hours or more, even better water repellency and adhesiveness can be achieved, and by setting the reaction time to 480 hours or less, layer separation is suppressed more easily.

In addition, when silica particles are included in the hydrolyzed solution, the condensation reaction time can be further shortened. The reason for this is presumed to be that the silanol group, the reactive group, or both of those groups having the polysiloxane compound group and the silane monomer group in the hydrolyzed solution form a hydrogen bond, a chemical bond, or a combination of such bonds with the silanol group of the silica particles. In this case, the condensation reaction time may be, for example, 10 minutes to 24 hours, or 30 minutes to 12 hours. By setting the reaction time to 10 minutes or more, even better water repellency and adhesiveness can be achieved, and by setting the reaction time to 24 hours or less, layer separation is suppressed more easily.

As a result of the condensation reaction step, a treatment agent can be obtained that comprises a condensation product of a liquid composition comprising at least one selected from the group consisting of a polysiloxane compound having a hydrolyzable functional group or a condensable functional group and a hydrolyzate of the polysiloxane compound having a hydrolyzable functional group. In addition, as a result of this step, a treatment agent comprising the above-mentioned water-repellent component can be obtained.

The size of the water-repellent particles can be adjusted by changing, for example, the condensation reaction time, the size of the silica particles, the size of the aerogel particles, and the like. This enables particles of a desired aspect to be obtained.

[Method for Treating Particles]

The method for treating the particles is not particularly limited, and examples thereof include methods mainly including a coating step, a washing step, and a drying step (pre-drying step and aging step).

Hereinafter, each of these steps will be described.

(Coating Step)

The coating step is a step of coating the surface to be treated of the particles (surface of the particles) with the above-mentioned treatment agent. In some cases, after coating the surface to be treated may be dried to volatilize the solvent. For example, by performing this step, a water-repellent portion (the form of a film and/or particles) can be formed on the surface to be treated. The entire surface to be treated may be coated or a part of the surface to be treated may be selectively coated with the treatment agent.

The coating method is not particularly limited, and examples thereof include spin coating, dip coating, spray coating, flow coating, bar coating, and gravure coating. In particular, a dip coating method is preferable because it has high productivity and can easily treat the surface of particles having irregularities. These methods may be used singly or in combination of two or more.

The surface to be treated of the particles may be coated with the treatment agent by coating or impregnating another film, cloth, or the like with the treatment agent in advance, and then contacting that coated or impregnated piece with the surface to be treated. The coating method can be freely selected according to the amount of treatment agent used, the area and the properties of the surface to be treated, and the like.

The temperature of the treatment agent used in the coating step may be, for example, 20 to 80° C., or 40 to 60° C. By setting the temperature to 20° C. or more, water repellency and adhesiveness tend to be even better, and by setting the temperature to 80° C. or less, the transparency of the water-repellent portion tends to be obtained more easily. The treatment time by the treatment agent can be, for example, 0.5 to 4 hours.

The adhesiveness of the water-repellent portion can be further improved by, after coating with the treatment agent, drying the obtained particles to volatilize the solvent. The drying temperature in this case is not particularly limited, and depends on the heat resistant temperature of surface to be treated; however, the drying temperature may be, for example, 60 to 250° C., or 120 to 180° C. By setting this temperature to 60° C. or more, even better adhesiveness can be achieved, and by setting the temperature to 250° C. or less, degradation due to heat can be suppressed.

(Washing Step)

The washing step is a step of washing the particles obtained in the coating step. By performing this step, impurities such as unreacted substances and by-products in the water-repellent portion can be reduced, thereby enabling a higher purity water-repellent portion to be obtained.

The washing step can be, for example, carried out repeatedly using water and/or an organic solvent. At that time, the washing efficiency can be improved by warming.

Examples of the organic solvents that can be used include a variety of organic solvents, such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylenechloride, N,N-dimethylformamide, dimethyl sulfoxide, acetic acid, and formic acid. These organic solvents may be used singly or in a mixture of two or more.

Organic solvents generally have extremely low mutual solubility with water. Therefore, when washing by using an organic solvent after washing with water, an organic solvent having high mutual solubility with water is preferable. Among such organic solvents, examples of the hydrophilic organic solvents include methanol, ethanol, 2-propanol, acetone, methyl ethyl ketone, and 1,2-dimethoxyethane. In addition, methanol, ethanol, methyl ethyl ketone, and the like are preferable in terms of their excellent economic efficiency.

The amount of the water and/or organic solvent used in the washing step may be, for example, an amount that is 3 to 10 times based on the total mass of the water-repellent portion. The washing can be repeated until the water content of the particle surface is 10% by mass or less.

The washing temperature may be a temperature equal to or less than the boiling point of the solvent used for washing; for example, when methanol is used, the washing temperature may be about 20 to 60° C. The washing efficiency can also be improved by warming. The washing time may be, for example, 3 to 30 minutes.

(Drying Step: Pre-Drying Step)

A pre-drying step is a step of pre-drying the particles washed in the washing step.

The drying technique is not particularly restricted, and a known drying method under atmospheric pressure can be used, for example. The drying temperature depends on the heat resistant temperature of the particle and the kind of the washing solvent. From the viewpoint of having a sufficiently rapid evaporation rate of the solvent and easily preventing degradation of the water-repellent portion, the drying temperature may be, for example, 20 to 250° C., or 60 to 180° C. The drying time depends on the mass of the water-repellent portion and the drying temperature, but may be, for example, 1 to 24 hours.

(Drying Step: Aging Step)

The aging step is a step of thermally aging the water-repellent portion dried in the pre-drying step. As a result of this step, the final water-repellent particle can be obtained. By performing the aging step, the water repellency and adhesiveness of the water-repellent particle are further improved.

This step can be performed as additional drying after the pre-drying step. It is considered that by performing aging, hydrophilic groups in the water-repellent portion are reduced and water repellency is further improved. In addition, when transparency deteriorates due to the water-repellent portion causing volume shrinkage in the pre-drying step, the transparency may be improved by restoring the volume through springing back.

The aging temperature depends on the heat resistant temperature of the particle, but may be, for example, 100 to 250° C., or 120 to 180° C. By setting the aging temperature to 100° C. or more, even better water repellency and adhesiveness can be achieved, and by setting the aging temperature to 250° C. or less, degradation due to heat can be suppressed.

The aging time depends on the mass of the water-repellent portion and the aging temperature, but may be, for example, 1 to 10 hours, or 2 to 6 hours. By setting the aging time to 1 hour or more, it is easier to achieve even better water repellency and adhesiveness, and by setting the aging time to 10 hours or less, it is less likely that productivity is reduced.

Although an example of the production method of the treatment agent and the water-repellent particle have been described above, the production method of the treatment agent and the water-repellent particle is not limited to this.

<Water-Repellent Layer Using Water-Repellent Particles>

Next, a water-repellent layer using the above-mentioned water-repellent particles will be described. The water-repellent layer according to the present embodiment can include an aggregation having a plurality of the water-repellent particles according to the present embodiment. Such a water-repellent layer is excellent in water repellency as a result of having a plurality of particles excellent in water repellency, and since those water-repellent particles maintain their characteristics as particles, various functions of the particles can be added. The aspect of the water-repellent layer is not particularly limited as long as the water-repellent layer includes an aggregation having a plurality of the water repellent particles of the present embodiment. Examples of the aspect of the water-repellent layer include an aggregation (layer) in which water-repellent particles are embedded, and an aspect in which a mixture of the water-repellent particles and a binder such as a resin or a cement and the water-repellent particles are dispersed in a fiber sheet. The water-repellent layer may be used alone or in combination of two or more kinds.

Figure 6:
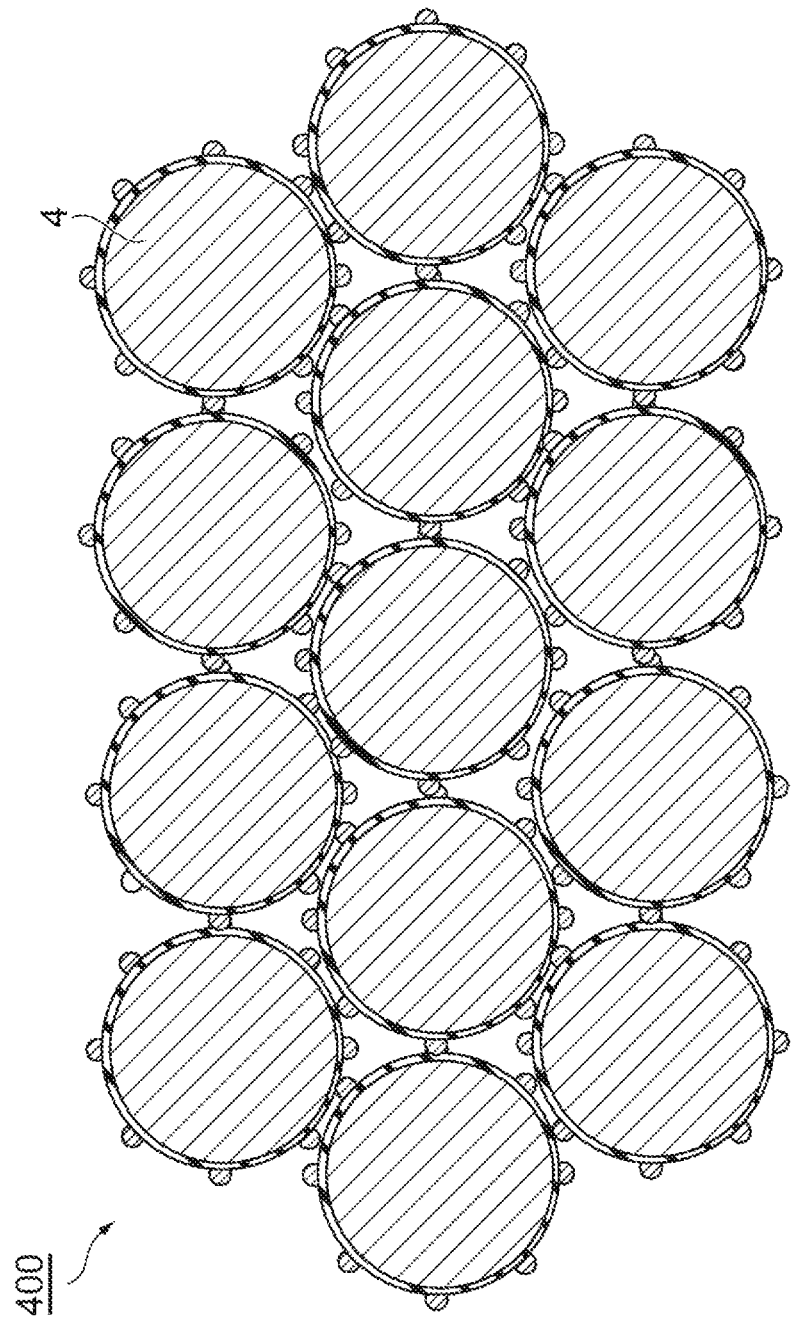
FIG. 6 is a diagram schematically illustrating a water-repellent layer according to an embodiment of the present invention.

FIG. 6 is a diagram schematically illustrating a water-repellent layer according to an embodiment of the present invention. A water-repellent layer 400 illustrated in FIG. 6 includes an aggregation in which water-repellent particles 4 are in close contact with each other at multiple points. The water-repellent particles 4 may have a structure like that of the water-repellent particles 100, 200, or 300 illustrated in FIGS. 3 to 5. It is considered that the water-repellent layer 400 has excellent water repellency as a result of having a plurality of water-repellent particles, and the spaces between the particles are excellent in air permeability.

<Penetration Preventing Structure>

Next, a penetration preventing structure including the above-mentioned water-repellent layer will be described. The penetration preventing structure according to the present embodiment comprises the water-repellent layer of the present embodiment. As a result of having a water-repellent layer excellent in water repellency, such a penetration preventing structure is excellent in preventing penetration of water, and various functions possessed by the water-repellent layer can be added. The aspect of the penetration preventing structure is not particularly limited as long as the penetration preventing structure has the water-repellent layer of the present embodiment. Examples of the aspect of the penetration preventing structure include a water storage structure in which with the water-repellent layer is provided in soil of a predetermined depth from the ground surface, and a concrete structure such as a dike having the water-repellent layer at the surface and inside the structure. The penetration preventing structure may be used alone or in combination of two or more kinds.

Figure 7:
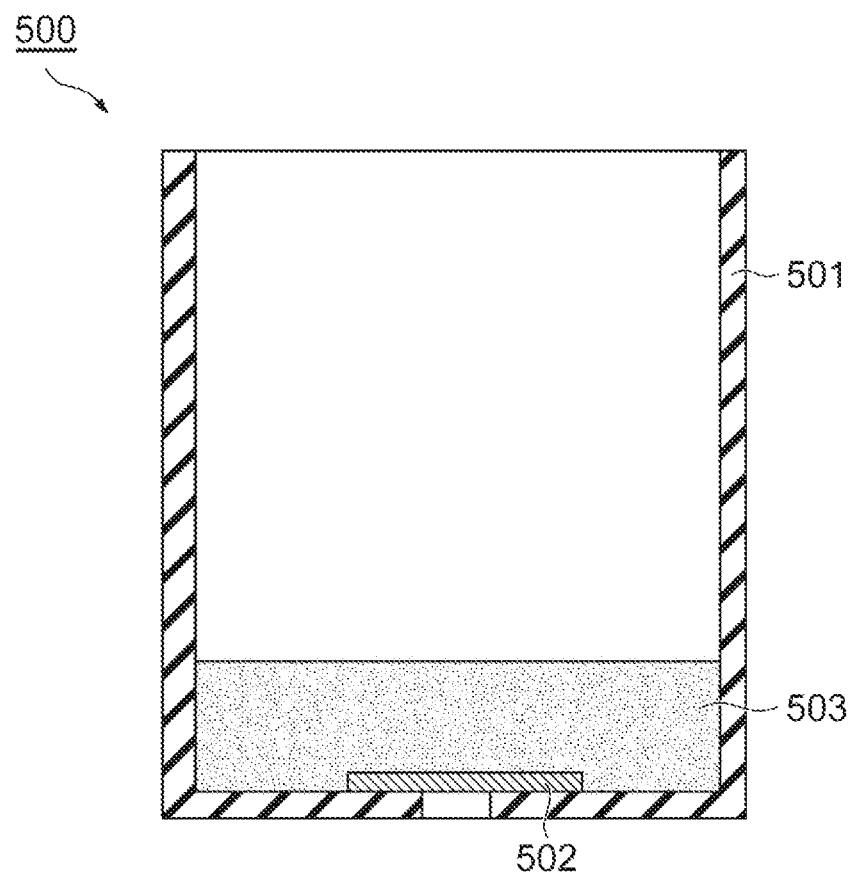
FIG. 7 is a diagram schematically illustrating a penetration preventing structure according to an embodiment of the present invention.

For example, FIG. 7 is a diagram schematically illustrating a penetration preventing structure according to an embodiment of the present invention. A penetration preventing structure 500 illustrated in FIG. 7 is a structure composed of a water-repellent layer 503 arranged on a nonwoven fabric 502, which is for the purpose of preventing the water-repellent layer from falling out of a hole, placed in a polypropylene cup 501 (diameter 40 mm, height 70 mm) having a hole with a diameter of 3 mm at the bottom. When water is placed in the penetration preventing structure 500, if the structure is not effective, the water will penetrate and leaks from the above-mentioned hole. The penetration preventing structure 500 is considered to be excellent in preventing penetration of water and excellent in air permeability as a result of including the water-repellent layer of the present embodiment. From such a point of view, it can be said that the water-repellent layer is a gas selective penetration layer, and the penetration preventing structure is a gas selective penetration structure.

EXAMPLES

The present invention will now be described in more detail by the following Examples, which should not be construed as limiting the present invention.

Example 1

[Treatment Agent 1]

Mixed together were 40.0 parts by mass of carbinol modified siloxane "XF42-C5277" (product name, manufactured by Momentive) as a polysiloxane compound, and 6.4 parts by mass of cetyltrimethylammonium bromide (manufactured by Wako Pure Chemical Industries, Ltd.: hereafter abbreviated as "CTAB") as a cationic surfactant, and 51.6 parts by mass of a 100 mM aqueous acetic acid solution, and the mixture was stirred at 25° C. for 2 hours. To this was added 2.0 parts by mass of sodium carbonate as a base catalyst, and the resultant was stirred at 60° C. for 2 hours to obtain treatment agent 1.

[Water-Repellent Particles 1]

The treatment agent 1 was dipped in 100 parts by mass of Flattery silica sand, (product name, manufactured by Mitsubishi Shoji Construction Materials Co., Ltd.), and treated at 60° C. for 2 hours. Then, the treated Flattery silica sand was dipped in methanol, washed at 25° C. for 5 minutes, dipped in methyl ethyl ketone, and washed at 25° C. for 5 minutes. The washed Flattery silica sand was dried at 120° C. under normal pressure for 1 hour, and then aged at 150° C. for 6 hours to obtain water-repellent particles 1.

[Water-Repellent Layer 1]

A water-repellent layer 1 was obtained by adhering double-sided tape No. 500 (product name, manufactured by Nitto Denko Corporation) to a slide glass S7213 (product name, manufactured by Matsunami Glass Ind., Ltd.), and then packing and pressing thereon 3 parts by mass of water-repellent particles 1.

Example 2

[Treatment Agent 2]

Mixed together were 20.0 parts by mass of a polysiloxane compound A as a polysiloxane compound, 3.2 parts by mass of CTAB as a cationic surfactant, and 75.8 parts by mass of 100 mM aqueous acetic acid solution, and the mixture was stirred at 25° C. for 2 hours. To this was added 1.0 part by mass of sodium carbonate as a base catalyst, and the resultant was stirred at 60° C. for 2 hours to obtain a treatment agent 2.

The "polysiloxane compound A" was synthesized as follows. First, in a 1-liter three-necked flask equipped with a stirrer, a thermometer, and a Dimroth condenser, 100.0 parts by mass of hydroxy-terminated dimethylpolysiloxane "XC96-723" (product name, manufactured by Momentive), 181.3 parts by mass of methyltrimethoxysilane, and 0.50 parts by mass of t-butylamine were mixed and reacted at 30° C. for 5 hours. Then, the reaction solution was heated at 140° C. for 2 hours under a reduced pressure of 1.3 kPa to remove volatile components, to thereby obtain a biterminally bifunctional alkoxy-modified polysiloxane compound (polysiloxane compound A).

[Water-Repellent Particles 2]

Water-repellent particles 2 were obtained in the same manner as in Example 1, except that treatment agent 1 was changed to treatment agent 2.

[Water-Repellent Layer 2]

A water-repellent layer 2 was obtained in the same manner as in Example 1, except that water-repellent particles 1 were changed to water-repellent particles 2.

Example 3

[Treatment Agent 3]

Mixed together were 10.0 parts by mass of a polysiloxane compound A as a polysiloxane compound, 15.0 parts by mass of methyltrimethoxysilane KBM-13 (product name, manufactured by Shin-Etsu Chemical Co., Ltd.; hereinafter abbreviated as "MTMS") as a silane monomer, and 4.0 parts by mass of CTAB as a cationic surfactant and 69.8 parts by mass of the 100 mM aqueous acetic acid solution, and the mixture was stirred at 25° C. for 2 hours. To this was added 1.2 parts by mass of sodium carbonate as a base catalyst, and the resultant was stirred at 60° C. for 2 hours to obtain a treatment agent 3.

[Water-Repellent Particles 3]

Water-repellent particles 3 were obtained in the same manner as in Example 1, except that treatment agent 1 was changed to treatment agent 3.

[Water-Repellent Layer 3]

A water-repellent layer 3 was obtained in the same manner as in Example 1, except that water-repellent particles 1 were changed to water-repellent particles 3.

Example 4

[Treatment Agent 4]

Mixed together were 20.0 parts by mass of a polysiloxane compound B as a polysiloxane compound, 3.2 parts by mass of CTAB as a cationic surfactant, and 49.8 parts by mass of 100 mM aqueous acetic acid solution, and 25.0 parts by mass of the PL-5L solution adjusted to an acetic acid concentration of 100 mM as a raw material containing silica particles, and the mixture was stirred at 25° C. for 2 hours. To this was added 2.0 parts by mass of sodium carbonate as a base catalyst, and the resultant was stirred at 60° C. for 2 hours to obtain a treatment agent 4.

The "polysiloxane compound B" was synthesized as follows. First, in a 1-liter three-necked flask equipped with a stirrer, a thermometer, and a Dimroth condenser, 100.0 parts by mass of XC96-723, 202.6 parts by mass of tetramethoxysilane, and 0.50 parts by mass of t-butylamine were mixed and reacted at 30° C. for 5 hours. Then, the reaction solution was heated at 140° C. for 2 hours under a reduced pressure of 1.3 kPa to remove volatile components, to thereby obtain a biterminally trifunctional alkoxy-modified polysiloxane compound (polysiloxane compound B).

[Water-Repellent Particles 4]

Water-repellent particles 4 were obtained in the same manner as in Example 1, except that treatment agent 1 was changed to treatment agent 4.

[Water-Repellent Layer 4]

A water-repellent layer 4 was obtained in the same manner as in Example 1, except that water-repellent particles 1 were changed to water-repellent particles 4.

Example 5

[Treatment Agent 5]

Mixed together were 1.0 part by mass of the polysiloxane compound A as a polysiloxane compound, 3.0 parts by mass of MTMS, 1.0 part by mass of dimethyldimethoxysilane KBM-22 (product name, manufactured by Shin-Etsu Chemical Co., Ltd.; hereinafter abbreviated as "DMDMS") as a silane monomer, 0.8 parts by mass of CTAB as a cationic surfactant, and 88.7 parts by mass of 100 mM aqueous acetic acid solution, and 5.0 parts by mass of the PL-2L solution adjusted to an acetic acid concentration of 100 mM as a raw material containing silica particles, and the mixture was stirred at 25° C. for 2 hours. To this was added 0.5 parts by mass of sodium carbonate as a base catalyst, and the resultant was stirred at 60° C. for 2 hours to obtain a treatment agent 5.

[Water-Repellent Particles 5]

Water-repellent particles 5 were obtained in the same manner as in Example 1, except that treatment agent 1 was changed to treatment agent 5.

[Water-Repellent Layer 5]

A water-repellent layer 5 was produced in the same manner as in Example 1, except that water-repellent particles 1 were changed to water-repellent particles 5.

Example 6

[Water-Repellent Particles 6]

Water-repellent particles 6 were obtained in the same manner as in Example 5, except that the Flattery silica sand was changed to glass beads BZ-01 (product name, AS ONE Corporation) having a particle size of 0.11 mm.

[Water-Repellent Layer 6]

A water-repellent layer 6 was produced in the same manner as in Example 1, except that water-repellent particles 1 were changed to water-repellent particles 6.

Example 7

[Treatment Agent 6]

Mixed together were 10.0 parts by mass of the polysiloxane compound A as a polysiloxane compound, 15.0 parts by mass of MTMS as a silane monomer, 4.0 parts by mass of CTAB as a cationic surfactant, 69.8 parts by mass of the 100 mM aqueous acetic acid solution, and 1.2 parts by mass of sodium carbonate as a base catalyst, and the mixture was stirred at 25° C. for 6 hours to obtain a treatment agent 6.

[Water-Repellent Particles 7]

Water-repellent particles 7 were obtained in the same manner as in Example 1, except that treatment agent 1 was changed to treatment agent 6.

[Water-Repellent Layer 7]

A water-repellent layer 7 was obtained in the same manner as in Example 1, except that water-repellent particles 1 were changed to water-repellent particles 6.

Example 8

[Treatment Agent 7]

Mixed together were 1.0 parts by mass of the polysiloxane compound A as a polysiloxane compound, 3.0 parts by mass of MTMS and 1.0 parts by mass of DMDMS as a silane monomer, 0.8 parts by mass of CTAB as a cationic surfactant, 88.7 parts by mass of the 100 mM aqueous acetic acid solution, 5.0 parts by mass of the PL-2L solution adjusted to an acetic acid concentration of 100 mM as a raw material containing silica particles, and 0.5 parts by mass of sodium carbonate as a base catalyst, and the mixture was stirred at 25° C. for 6 hours to obtain a treatment agent 7.

[Water-Repellent Particles 8]

Water-repellent particles 8 were obtained in the same manner as in Example 1, except that treatment agent 1 was changed to treatment agent 7.

[Water-Repellent Layer 8]

A water-repellent layer 8 was obtained in the same manner as in Example 1, except that water-repellent particles 1 were changed to water-repellent particles 7.

Example 9

[Treatment Agent 8]

Mixed together were 10.0 parts by mass of the polysiloxane compound A as a polysiloxane compound, 15.0 parts by mass of MTMS as a silane monomer, 4.0 parts by mass of CTAB as a cationic surfactant, 69.8 parts by mass of the 100 mM aqueous acetic acid solution, and 1.0 parts by mass of IC3100 (product name, manufactured by Cabot) as aerogel particles, and the mixture was stirred at 25° C. for 2 hours. To this was added 2.0 parts by mass of sodium carbonate as a base catalyst, and the resultant was stirred at 60° C. for 2 hours to obtain a treatment agent 8.

[Water-Repellent Particles 9]

Water-repellent particles 9 were obtained in the same manner as in Example 1, except that treatment agent 1 was changed to treatment agent 8.

[Water-Repellent Layer 9]

A water-repellent layer 9 was obtained in the same manner as in Example 1, except that water-repellent particles 1 were changed to water-repellent particles 8.

Example 10

[Treatment Agent 9]

Mixed together were 1.0 parts by mass of the polysiloxane compound A as a polysiloxane compound, 3.0 parts by mass of MTMS and 1.0 parts by mass of DMDMS as a silane monomer, 0.8 parts by mass of CTAB as a cationic surfactant, 88.7 parts by mass of the 100 mM aqueous acetic acid solution, 5.0 parts by mass of the PL-2L solution adjusted to an acetic acid concentration of 100 mM as a raw material containing silica particles, 1.0 parts by mass of IC3100 as aerogel particles, and 0.5 parts by mass of sodium carbonate as a base catalyst, and the mixture was stirred at 25° C. for 6 hours to obtain a treatment agent 9.

[Water-Repellent Particles 10]

Water-repellent particles 10 were obtained in the same manner as in Example 1, except that treatment agent 1 was changed to treatment agent 9.

[Water-Repellent Layer 10]

A water-repellent layer 10 was obtained in the same manner as in Example 1, except that water-repellent particles 1 were changed to water-repellent particles 9.

Comparative Example 1

[Comparative Treatment Agent 1]

Mixed together were 30.0 parts by mass of MTMS as a silane monomer, 2.4 parts by mass of CTAB as a cationic surfactant, and 66.1 parts by mass of 100 mM aqueous acetic acid solution, and the mixture was stirred at 25° C. for 2 hours. To this was added 1.5 parts by mass of sodium carbonate as a base catalyst, and the resultant was stirred at 60° C. for 2 hours to obtain comparative treatment agent 1.

[Comparative Water-Repellent Particles 1]

Comparative water-repellent particles 1 were obtained in the same manner as in Example 1, except that treatment agent 1 was changed to comparative treatment agent 1.

[Comparative Water-Repellent Layer 1]

A comparative water-repellent layer 1 was obtained in the same manner as in Example 1, except that water-repellent particles 1 were changed to comparative water-repellent particles 1.

Comparative Example 2

[Comparative Treatment Agent 2]

Mixed together were 20.0 parts by mass of MTMS as a silane monomer, 15.0 parts by mass of DMDMS, 2.8 parts by mass of CTAB as a cationic surfactant, and 60.5 parts by mass of 100 mM aqueous acetic acid solution, and the mixture was stirred at 25° C. for 2 hours. To this was added 1.7 parts by mass of sodium carbonate as a base catalyst, and the resultant was stirred at 60° C. for 2 hours to obtain comparative treatment agent 2.

[Comparative Water-Repellent Particles 2]

Comparative water-repellent particles 2 were obtained in the same manner as in Example 1, except that treatment agent 1 was changed to comparative treatment agent 2.

[Comparative Water-Repellent Layer 2]

A comparative water-repellent layer 2 was obtained in the same manner as in Example 1, except that water-repellent particles 1 were changed to comparative water-repellent particles 2.

Comparative Example 3

[Comparative Water-Repellent Particles 3]

Comparative water-repellent particles 3 were obtained in the same manner as in Comparative Example 2, except that Flattery silica sand was changed to glass beads BZ-01 (product name, AS ONE Corporation) having a particle size of 0.11 mm.

[Comparative Water-Repellent Layer 3]

A comparative water-repellent layer 3 was produced in the same manner as in Example 1, except that water-repellent particles 1 were changed to comparative water-repellent particles 3.

The aspects (kind and content of polysiloxane compound, kind and content of silane monomer, and kind and content of raw material containing silica particles) of the treatment agent in each Example and Comparative Example are collectively shown in Table 1. Further, the aspects (kind and treatment method of the treatment agent, and the kind of treatment target) of the water-repellent particles in each Example and Comparative Example are also collectively shown in Table 2.

TABLE 1

| | | Si Raw Material | | Raw Material Containing Silica Particles | | | | | | | |
|---|---|---|---|---|---|---|---|---|---|---|---|
| | | | | | | Silica Particles | | | | | |
| | | | | | | | | | | Aerogel | |
| | | Kind | Content (parts by mass) | Kind | Number of Silanol Groups (groups/g) | Kind | Shape | Average Primary Particle Size (nm) | Solid Fraction (% by mass) | Particles Content (% by mass) | Solid Content (% by mass) |
| Water-Repellent | 1 | XF42-C5277 | 40.0 | — | — | — | — | — | — | — | — |
| | 2 | Polysiloxane | 20.0 | — | — | — | — | — | — | — | — |

TABLE 1-continued

| | | | Raw Material Containing Silica Particles | | | | | | | |
|---|---|---|---|---|---|---|---|---|---|---|
| | | Si Raw Material | | | Silica Particles | | | | Aerogel | |
| | | Kind | Content (parts by mass) | Kind | Number of Silanol Groups (groups/g) | Kind | Shape | Average Primary Particle Size (nm) | Solid Fraction (% by mass) | Particles Content (% by mass) | Solid Content (% by mass) |
| Treatment Agent | 3 | Polysiloxane Compound A | 10.0 | — | — | — | — | — | — | — | — |
| | | MTMS | 15.0 | | | | | | | | |
| | 4 | Polysiloxane Compound B | 20.0 | PL-5L | 190 × 10$^{18}$ | Colloidal Silica | Cocoon | 50 | 20 | — | 5.0 |
| | 5 | Polysiloxane Compound A | 1.0 | PL-2L | 550 × 10$^{18}$ | Colloidal Silica | Spherical | 20 | 20 | — | 1.0 |
| | | MTMS | 3.0 | | | | | | | | |
| | | DMDMS | 1.0 | | | | | | | | |
| | 6 | Polysiloxane Compound A | 10.0 | — | — | — | — | — | — | — | — |
| | | MTMS | 15.0 | | | | | | | | |
| | 7 | Polysiloxane Compound A | 1.0 | PL-2L | 550 × 10$^{18}$ | Colloidal Silica | Spherical | 20 | 20 | — | 1.0 |
| | | MTMS | 3.0 | | | | | | | | |
| | | DMDMS | 1.0 | | | | | | | | |
| | 8 | Polysiloxane Compound A | 10.0 | — | — | — | — | — | — | 1.0 | 1.0 |
| | | MTMS | 15.0 | | | | | | | | |
| | 9 | Polysiloxane Compound A | 1.0 | PL-2L | 550 × 10$^{18}$ | Colloidal Silica | Spherical | 20 | 20 | 1.0 | 2.0 |
| | | MTMS | 3.0 | | | | | | | | |
| | | DMDMS | 1.0 | | | | | | | | |
| Comparative Water-Repellent Treatment Agent | 1 | MTMS | 30.0 | — | — | — | — | — | — | — | — |
| | 2 | MTMS | 20.0 | — | — | — | — | — | — | — | — |
| | | DMDMS | 15.0 | | | | | | | | |

TABLE 2

| | Water-Repellent Treatment Agent | | |
|---|---|---|---|
| | Kind | Treatment Method | Treatment Target Kind |
| Example 1 | Water-Repellent Treatment Agent 1 | Dip Coating | Flattery silica sand |
| Example 2 | Water-Repellent Treatment Agent 2 | Dip Coating | Flattery silica sand |
| Example 3 | Water-Repellent Treatment Agent 3 | Dip Coating | Flattery silica sand |
| Example 4 | Water-Repellent Treatment Agent 4 | Dip Coating | Flattery silica sand |
| Example 5 | Water-Repellent Treatment Agent 5 | Dip Coating | Flattery silica sand |
| Example 6 | Water-Repellent Treatment Agent 5 | Dip Coating | Glass beads BZ-01 |
| Example 7 | Water-Repellent Treatment Agent 6 | Dip Coating | Flattery silica sand |
| Example 8 | Water-Repellent Treatment Agent 7 | Dip Coating | Flattery silica sand |
| Example 9 | Water-Repellent Treatment Agent 8 | Dip Coating | Flattery silica sand |
| Example 10 | Water-Repellent Treatment Agent 9 | Dip Coating | Flattery silica sand |
| Comparative Example 1 | Comparative Water-Repellent Treatment Agent 1 | Dip Coating | Flattery silica sand |
| Comparative Example 2 | Comparative Water-Repellent Treatment Agent 2 | Dip Coating | Flattery silica sand |
| Comparative Example 3 | Comparative Water-Repellent Treatment Agent 2 | Dip Coating | Glass beads BZ-01 |

[Evaluations]

The water-repellent particles and the water-repellent layer obtained in each Example and Comparative Example were measured or evaluated according to the following conditions. The evaluation results of the water contact angle measurement, durability test (in water, in an organic solvent), and measurement of the signal area ratio of the silicon-containing bonding units Q, T, and D are collectively shown in Table 3. In addition, for the penetration preventing structure including the water-repellent layer, the evaluation results of the penetration prevention test and the air permeability test are collectively shown in Table 4.

(1) Water Contact Angle Measurement

The water-repellent layer obtained in each Example and Comparative Example was vacuum dried at 40° C. for use as measurement samples. Next, 2 μL of ultrapure water droplets were dropped by using a contact angle meter DMs-401 manufactured by Kyowa Interface Science Co., Ltd., and the contact angle after 5 seconds was measured at room temperature. The measurement was performed five times, and the average value was taken as the water contact angle.

(2) Durability Test (Water)

A durability test (water) was conducted by arranging on the water-repellent layer a Kimtowel manufactured by Nippon Paper Crecia Co., Ltd. of a size covering the whole surface of the water-repellent layer in a glass container, dropping water onto the Kimtowel, then sealing so that water did not evaporate, and leaving to stand. After 30 days, the water-repellent layer was taken out and vacuum dried at 40° C. for use as a measurement sample. Next, 2 μL of ultrapure water droplets were dropped using a contact angle meter DMs-401 manufactured by Kyowa Interface Science Co., Ltd., and the contact angle after 5 seconds was measured at room temperature. The measurement was performed five times, and the average value was taken as the water contact angle.

(3) Durability Test (Organic Solvent)

An abrasion test (organic solvent) was conducted by arranging on the water-repellent layer a Kimtowel manufactured by Nippon Paper Crecia Co., Ltd. of a size covering the whole surface of the water-repellent layer in a glass container, dropping methyl ethyl ketone onto the Kimtowel, then sealing so that methyl ethyl ketone did not evaporate, and leaving to stand. After 30 days, the water-repellent layer was taken out and vacuum dried at 40° C. for use as a measurement sample. Next, 2 μL of ultrapure water droplets were dropped using a contact angle meter DMs-401 manufactured by Kyowa Interface Science Co., Ltd., and the contact angle after 5 seconds was measured at room temperature. The measurement was performed five times, and the average value was taken as the water contact angle.

(4) Measurement of Signal Area Ratio Relating to Silicon-Containing Bonding Units Q, T, and D Measurement was carried out by using a "FT-NMR AV400WB" (product name, manufactured by Brucker Biospin KK) as a solid $^{29}$Si-NMR device. The measurement conditions were, measuring mode: DD/MAS method; probe: CPMAS probe with 4 mm φ; magnetic field: 9.4 T; resonance frequency: 79 Hz; MAS rotation speed: 4 kHZ; and delay time: 150 seconds. Sodium 3-trimethylsilylpropionate was used as the standard sample.

The water-repellent particles obtained in each Example and Comparative Example were finely crushed to prepare the measurement sample, which was then packed in a rotor made of $ZrO_2$ and mounted on a probe to carry out the measurement. Further, in the spectral analysis, the area ratio (Q+T:D) of the difference was determined by setting the line broadening coefficient to 2 Hz, and subtracting the signal area obtained from untreated particles from the signal area relating to the silicon-containing bonding units Q, T, and D obtained from the measurement sample.

(5) Penetration Prevention Test

As illustrated in FIG. 7 described above, a 1 cm-square piece of polyester non-woven fabric 909303 KSO (product name, manufactured by Unitika Ltd.) for the purpose of preventing the water-repellent layer from falling out of the hole was placed in a polypropylene cup (diameter 40 mm, height 70 mm) provided with a hole 3 mm in diameter at the bottom, and water-repellent particles were arranged thereon to a thickness of 10 mm for use as a measurement sample of the penetration preventing structure. Water was poured in until the water level reached 40 mm from the surface where the water-repellent particles come in contact with the water. The evaluation was carried out by checking the presence or absence of water leakage 10 minutes after the end of pouring the water; cases in which a water leakage was confirmed were evaluated as no good ("NG"), and cases in which a water leak was not confirmed were evaluated as "OK". The measurement was carried out three times.

(6) Breathability Test

A penetration preventing structure similar to that in the above-mentioned penetration prevention test was produced for use as a measurement sample. Water was poured in until the water level reached 40 mm from the surface where the water-repellent particles come in contact with the water. The evaluation was conducted 10 minutes after the end of pouring the water. After ventilating with 1.0 L/min of nitrogen from the hole at the bottom of the cup for 1 minute, the presence or absence of water leakage was checked; cases in which a water leak was confirmed were evaluated as no good ("NG"), and cases in which a water leak was not confirmed were evaluated as "OK". The measurement was carried out three times.

TABLE 3

| | Water Contact Angle (degrees) | Durability Test (water contact angle (degrees)) | | Q + T:D Area Ratio |
|---|---|---|---|---|
| | | Water | Organic Solvent | |
| Example 1 | 152 | 152 | 151 | 0:1 |
| Example 2 | 151 | 152 | 150 | 1:5.0 |
| Example 3 | 153 | 152 | 152 | 1:0.30 |
| Example 4 | 153 | 151 | 150 | 1:0.80 |
| Example 5 | 156 | 155 | 155 | 1:0.42 |
| Example 6 | 156 | 155 | 156 | 1:0.42 |
| Example 7 | 142 | 141 | 140 | 1:0.27 |
| Example 8 | 145 | 144 | 142 | 1:0.39 |
| Example 9 | 153 | 153 | 153 | 1:0.27 |
| Example 10 | 155 | 155 | 154 | 1:0.39 |
| Comparative Example 1 | 100 | 91 | 62 | 1:0 |
| Comparative Example 2 | 110 | 95 | 68 | 1:0.75 |
| Comparative Example 3 | 108 | 93 | 65 | 1:0.75 |

TABLE 4

| | Penetration Preventing Test (number of times) | | Air Permeability Test (number of times) | |
|---|---|---|---|---|
| | OK | NG | OK | NG |
| Example 1 | 3 | — | 3 | — |
| Example 2 | 3 | — | 3 | — |
| Example 3 | 3 | — | 3 | — |
| Example 4 | 3 | — | 3 | — |
| Example 5 | 3 | — | 3 | — |
| Example 6 | 3 | — | 3 | — |
| Example 7 | 3 | — | 3 | — |
| Example 8 | 3 | — | 3 | — |
| Example 9 | 3 | — | 3 | — |
| Example 10 | 3 | — | 3 | — |
| Comparative Example 1 | — | 3 | — | 3 |
| Comparative Example 2 | 1 | 2 | 1 | 2 |
| Comparative Example 3 | 2 | 1 | 2 | 1 |

From Table 3, it can be seen that the water-repellent layers formed from the water-repellent particles of the examples had superior water repellency and durability compared with the Comparative Examples, as all the water-repellent layers had a water contact angle of 150 degrees or more, and in the durability test as well, the water contact angle was maintained at 150 degrees or more for both water and an organic solvent.

From Table 4, it can be seen that for the penetration preventing structures of the Examples, in both the penetration prevention test and the air permeability test, there was no water leakage, the penetration of water was prevented, and air permeability was excellent.

From the above results, it can be seen that according to the treatment agent of the present invention, excellent water repellency and durability can be imparted without impairing the characteristics of the particles.

REFERENCE SIGNS LIST

L: Circumscribed rectangle, P: silica particle, 1: film-like water-repellent portion, 2: particle, 2a: surface to be treated, 3: particulate water-repellent portion, 10: water-repellent portion, 4, 100, 200, 300: water-repellent particle, 400, 503: water-repellent layer, 500: penetration preventing structure, 501: cup, 502: non-woven fabric.

The invention claimed is:

1. A water-repellent particle comprising:
   a particle; and
   a water-repellent portion comprising a dried product of a treatment agent on a surface to be treated of the particle, wherein the water-repellent portion on a surface to be treated of the particle comprises a film-like water-repellent portion and/or a particulate water-repellent portion on a surface to be treated of the particle,
   the treatment agent comprising:
   a condensation product of a liquid composition comprising at least one selected from the group consisting of a polysiloxane compound having a hydrolyzable functional group or a condensable functional group and a hydrolyzate of the polysiloxane compound having a hydrolyzable functional group or
   a liquid composition comprising at least one selected from the group consisting of a polysiloxane compound having a hydrolyzable functional group or a condensable functional group and a hydrolyzate of the polysiloxane compound having a hydrolyzable functional group,
   wherein the dried product of the treatment agent contains an aerogel formed from aerogel particles contained in the liquid composition, and the liquid composition contains aerogel particles in an amount of 0.1 to 10 parts by mass or less per 100 parts by mass of the total amount of the liquid composition.

2. The water-repellent particle according to claim 1, wherein the hydrolyzable functional group comprises an alkoxy group.

3. The water-repellent particle according to claim 2, wherein the polysiloxane compound having the hydrolyzable functional group comprising an alkoxy group comprises a compound having a structure represented by the following formula (B);

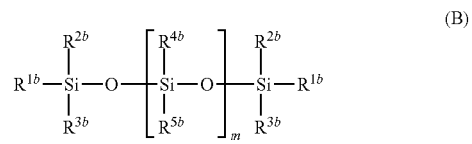

wherein $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50.

4. The water-repellent particle according to claim 1, wherein the condensable functional group comprises at least one selected from the group consisting of a hydroxyl group, a silanol group, a carboxyl group, and a phenolic hydroxyl group.

5. The water-repellent particle according to claim 4, wherein the hydroxyl group is contained in a hydroxyalkyl group.

6. The water-repellent particle according to claim 5, wherein the polysiloxane compound comprises a compound having a structure represented by the following formula (A);

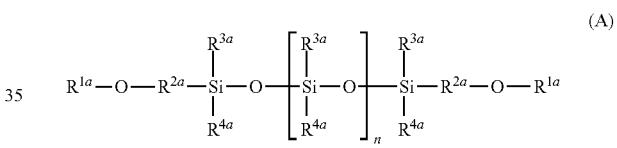

wherein $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50.

7. A water-repellent layer comprising an aggregation having a plurality of the water-repellent particles according to claim 1.

8. A penetration preventing structure comprising the water-repellent layer according to claim 7.

* * * * *